US010362795B2

(12) United States Patent
Backus

(10) Patent No.: US 10,362,795 B2
(45) Date of Patent: Jul. 30, 2019

(54) COLLAPSIBLE FOOD PREPARATION DEVICE

(71) Applicant: Alan Backus, Los Angeles, CA (US)

(72) Inventor: Alan Backus, Los Angeles, CA (US)

(73) Assignee: Alan Backus, Los Angeles, CA (US)

( * ) Notice: Subject to any disclaimer, the term of this patent is extended or adjusted under 35 U.S.C. 154(b) by 572 days.

(21) Appl. No.: 14/853,314

(22) Filed: Sep. 14, 2015

(65) Prior Publication Data
US 2017/0074584 A1 Mar. 16, 2017

(51) Int. Cl.
| | |
|---|---|
| *F26B 11/18* | (2006.01) |
| *A23L 3/00* | (2006.01) |
| *A23L 3/40* | (2006.01) |
| *F26B 3/04* | (2006.01) |
| *F26B 9/00* | (2006.01) |
| *F26B 9/06* | (2006.01) |
| *F26B 23/06* | (2006.01) |

(52) U.S. Cl.
CPC .............. *A23L 3/001* (2013.01); *A23L 3/40* (2013.01); *F26B 3/04* (2013.01); *F26B 9/003* (2013.01); *F26B 9/066* (2013.01); *F26B 23/06* (2013.01)

(58) Field of Classification Search
CPC ...... F26B 3/02; F26B 3/04; F26B 3/06; F26B 9/066; F26B 9/103; F26B 23/04; F26B 23/06
USPC ......... 34/192, 194, 195, 197, 201, 204, 209, 34/210, 211, 215, 218, 237, 238
See application file for complete search history.

(56) References Cited

U.S. PATENT DOCUMENTS

| | | | |
|---|---|---|---|
| 2,464,706 A | * | 3/1949 | McGraw ................ A62C 33/02 34/197 |
| 3,943,842 A | | 3/1976 | Bills et al. |
| 3,955,488 A | | 5/1976 | Wheeler |
| 4,006,260 A | | 2/1977 | Webb et al. |
| 4,028,816 A | | 6/1977 | Macy et al. |
| 4,052,589 A | * | 10/1977 | Wyatt ................... A47B 31/02 126/21 A |
| 4,065,857 A | | 1/1978 | Nelson et al. |
| 4,089,322 A | | 5/1978 | Guibert |
| 4,110,916 A | | 9/1978 | Bemrose |
| 4,127,947 A | | 12/1978 | Webb et al. |
| 4,143,592 A | | 3/1979 | Kuest et al. |
| 4,152,842 A | | 5/1979 | Laughlin |
| 4,167,901 A | | 9/1979 | Wright |
| 4,190,965 A | | 3/1980 | Erickson |
| 4,236,063 A | | 11/1980 | Glucksman |
| 4,237,623 A | | 12/1980 | Timm et al. |
| 4,318,230 A | | 3/1982 | Bacon |
| 4,337,384 A | | 6/1982 | Tanaka et al. |
| 4,346,522 A | | 8/1982 | Nakagaki |
| 4,380,127 A | | 4/1983 | Roberts |
| 4,531,306 A | | 7/1985 | Erickson |
| 4,534,118 A | | 8/1985 | Cabus et al. |
| 4,536,643 A | | 8/1985 | Erickson |

(Continued)

*Primary Examiner* — John P McCormack
(74) *Attorney, Agent, or Firm* — Ulmer & Berne LLP

(57) ABSTRACT

The present example embodiments relate to food preparation devices using natural flowing and/or fan driven circulating air, and details for the construction thereof. Example embodiments are shown, which may be reduced in size and volume by the user. Example embodiments are shown which utilize natural convection airflow. Example embodiments are also shown which utilize fan driven air which flows in alternating directions.

9 Claims, 27 Drawing Sheets

(56) References Cited

U.S. PATENT DOCUMENTS

| | | | |
|---|---|---|---|
| 4,619,053 A | | 10/1986 | Schumacher |
| 4,750,276 A | | 6/1988 | Smith et al. |
| 4,779,604 A | | 10/1988 | Konig |
| 5,215,004 A | | 6/1993 | Su |
| 5,235,906 A | | 8/1993 | Hsu |
| 5,261,168 A | | 11/1993 | Li |
| 5,311,673 A | | 5/1994 | Su |
| 5,379,527 A | | 1/1995 | Su |
| 5,420,393 A | | 5/1995 | Dornbush et al. |
| 5,423,249 A | | 6/1995 | Meyer |
| 5,437,108 A | | 8/1995 | Alseth |
| 5,454,298 A | | 10/1995 | Lu |
| 5,458,050 A | | 10/1995 | Su |
| 5,502,900 A | | 4/1996 | Hui |
| 5,826,498 A | * | 10/1998 | Su .................. A23B 7/0205 126/21 A |
| 5,878,508 A | | 3/1999 | Knoll et al. |
| 5,916,353 A | * | 6/1999 | Bennett .................. F26B 25/12 126/19 R |
| 5,950,526 A | * | 9/1999 | Hsu .................. A23B 4/031 219/386 |
| 5,960,560 A | | 10/1999 | Stoll |
| 5,974,957 A | | 11/1999 | Ysen |
| 6,085,442 A | | 7/2000 | Erickson |
| 6,195,906 B1 | | 3/2001 | Stoll |
| 6,415,736 B1 | * | 7/2002 | Hao .................. H01L 21/67017 118/723 E |
| 2002/0043003 A1 | * | 4/2002 | Cruz .................. A45D 20/12 34/97 |

\* cited by examiner

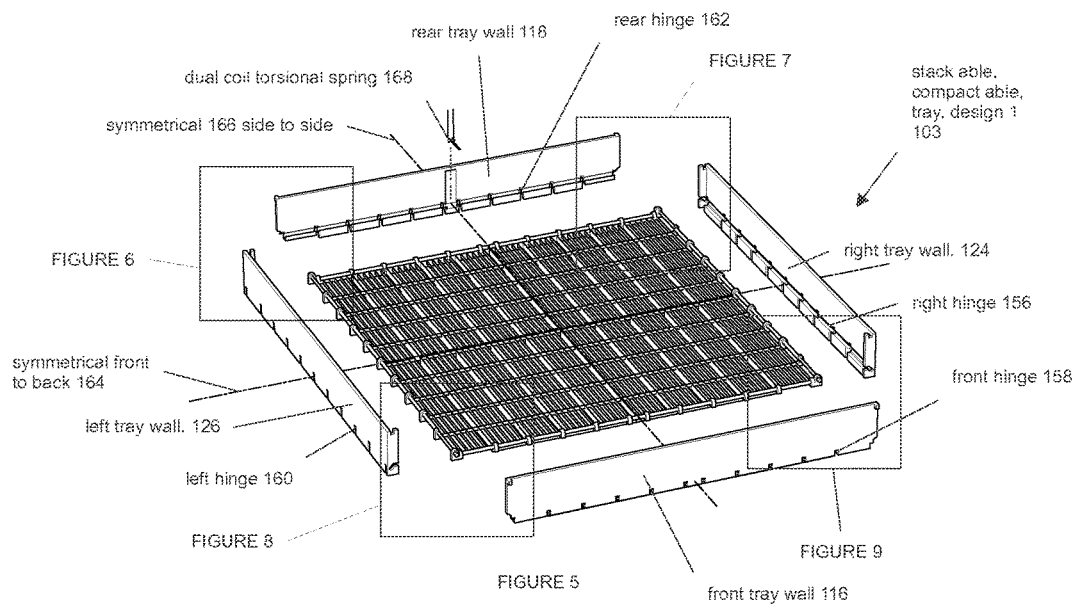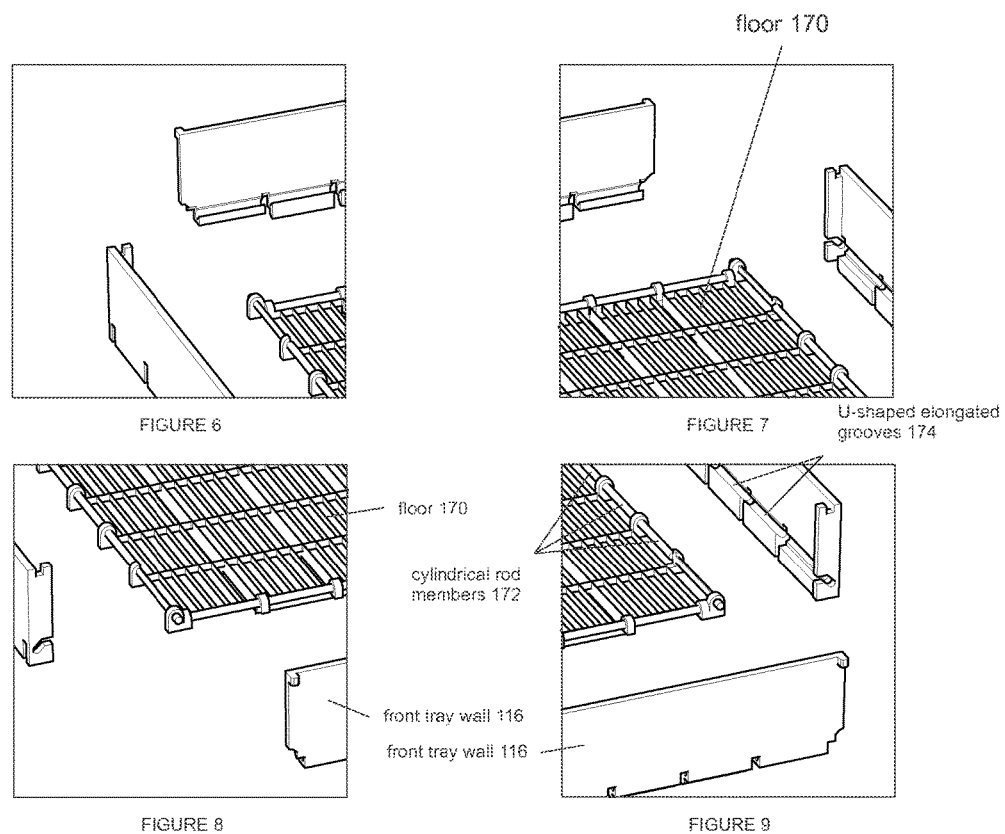

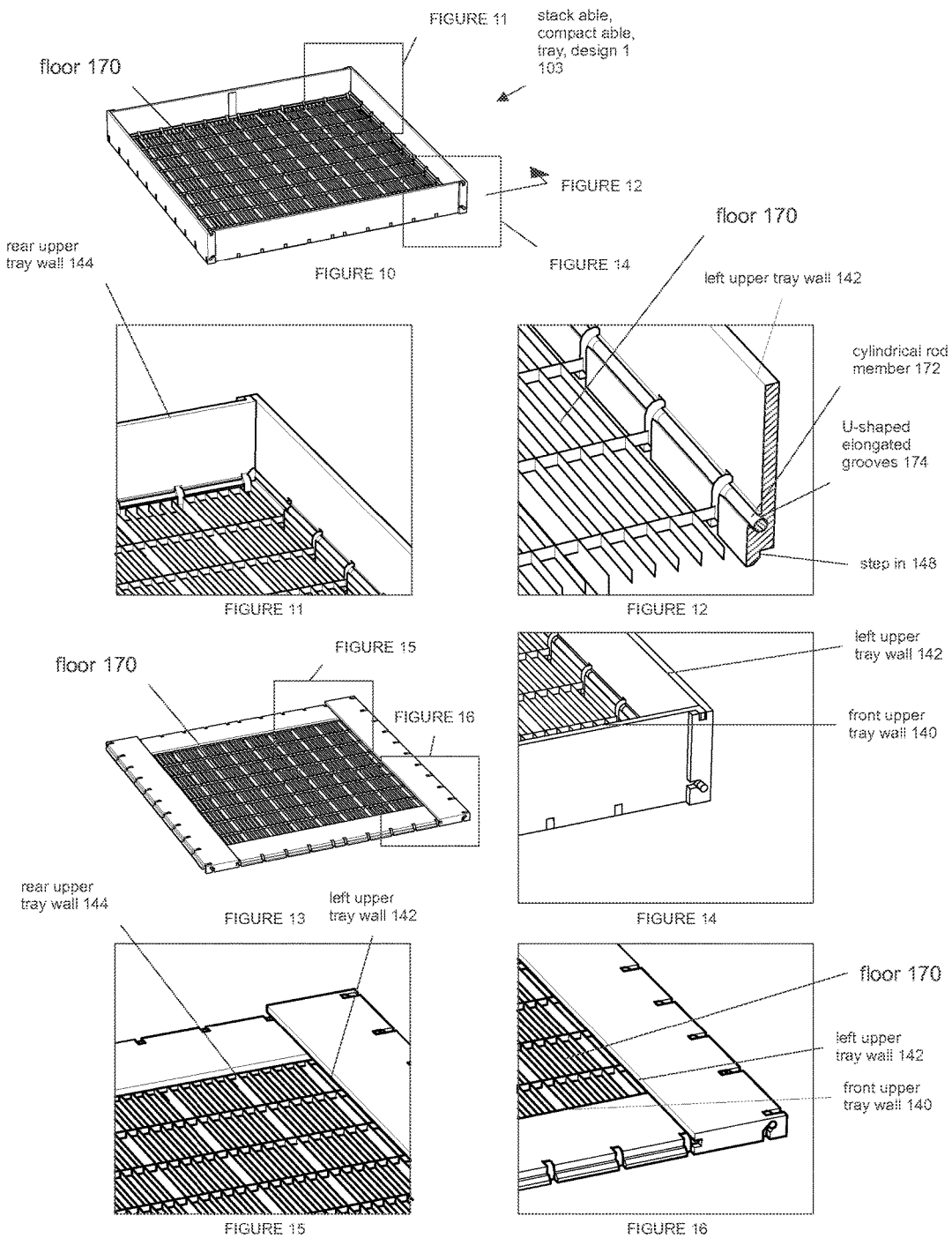

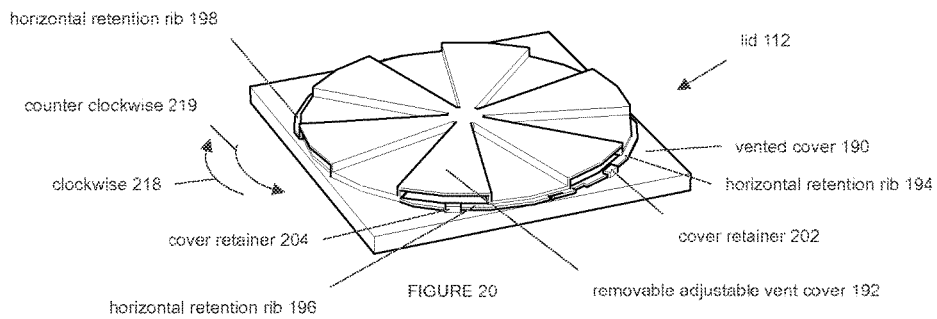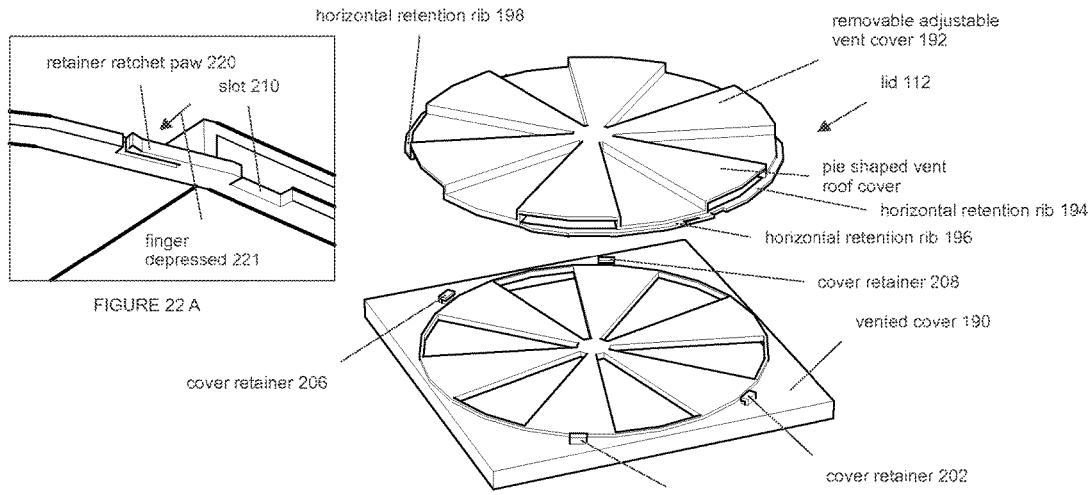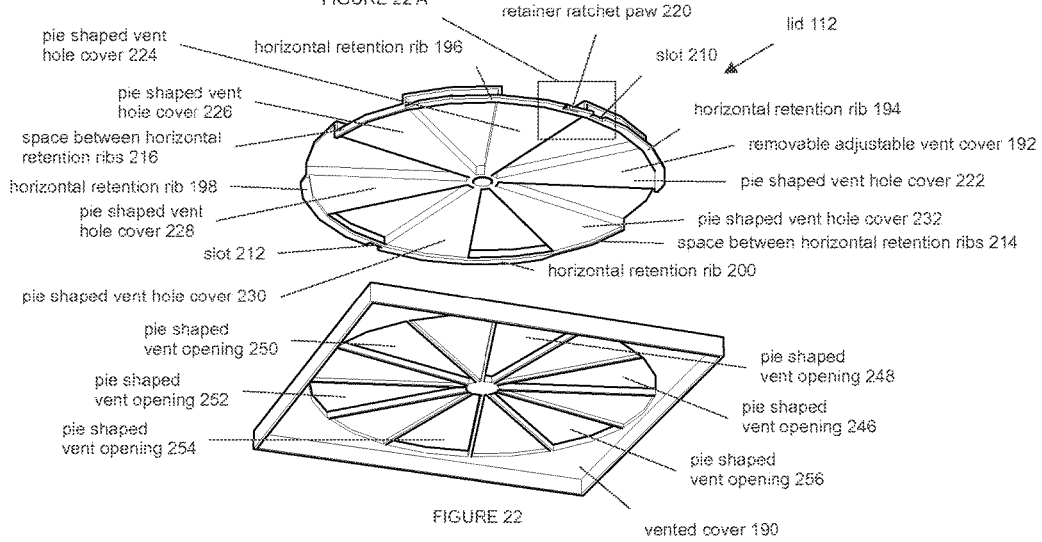

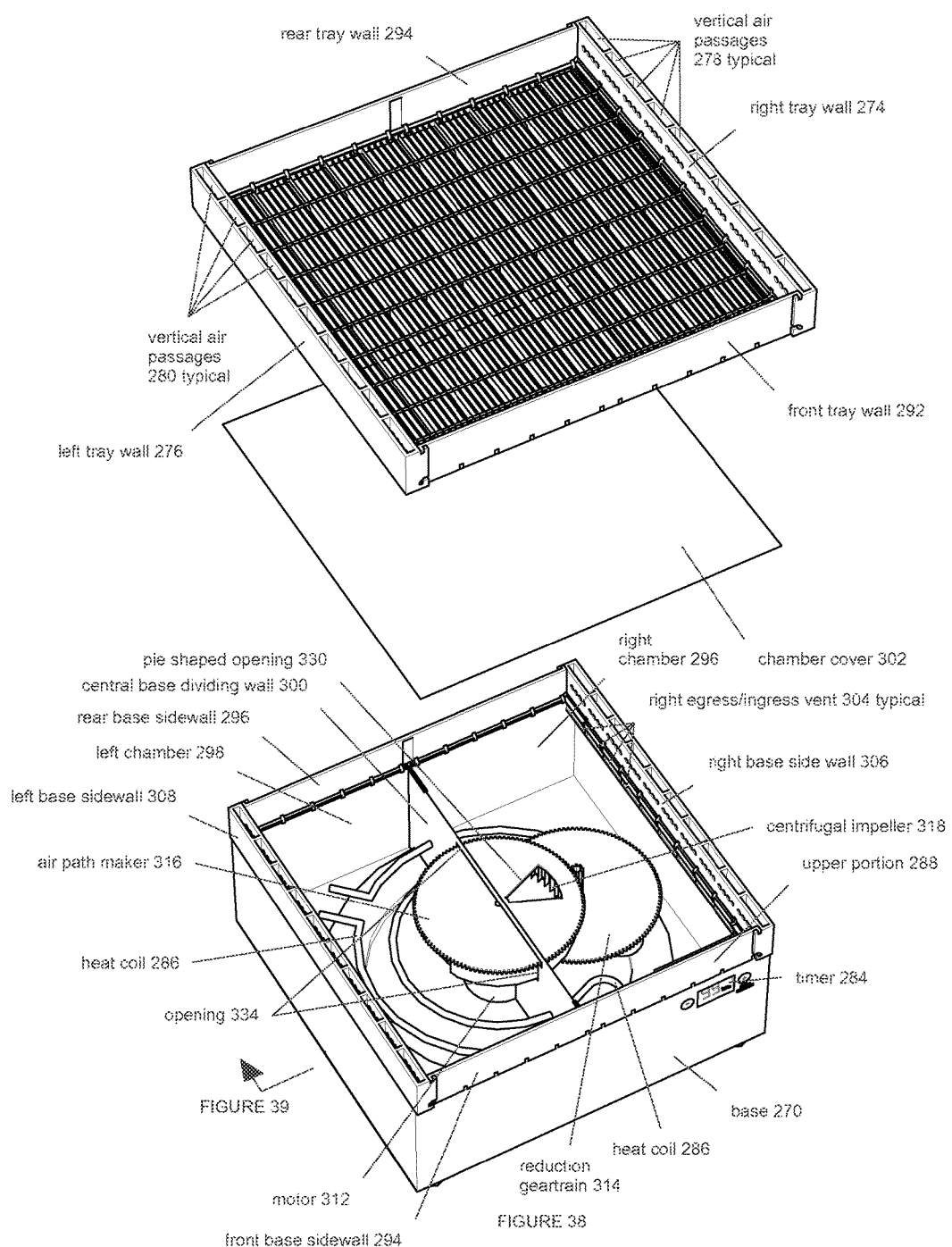

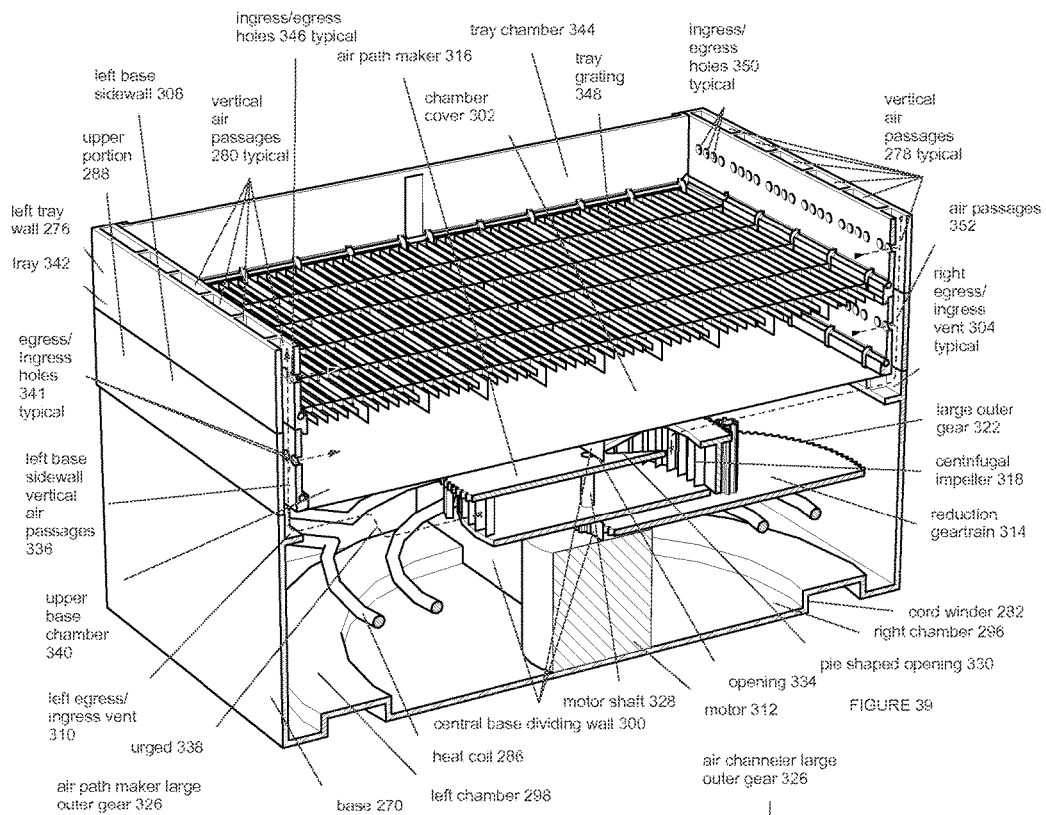
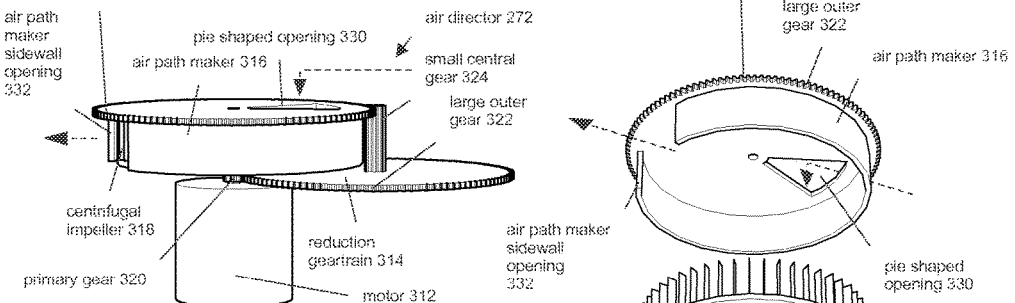
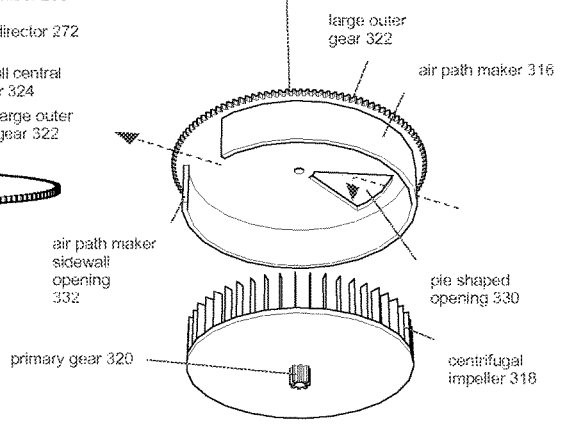

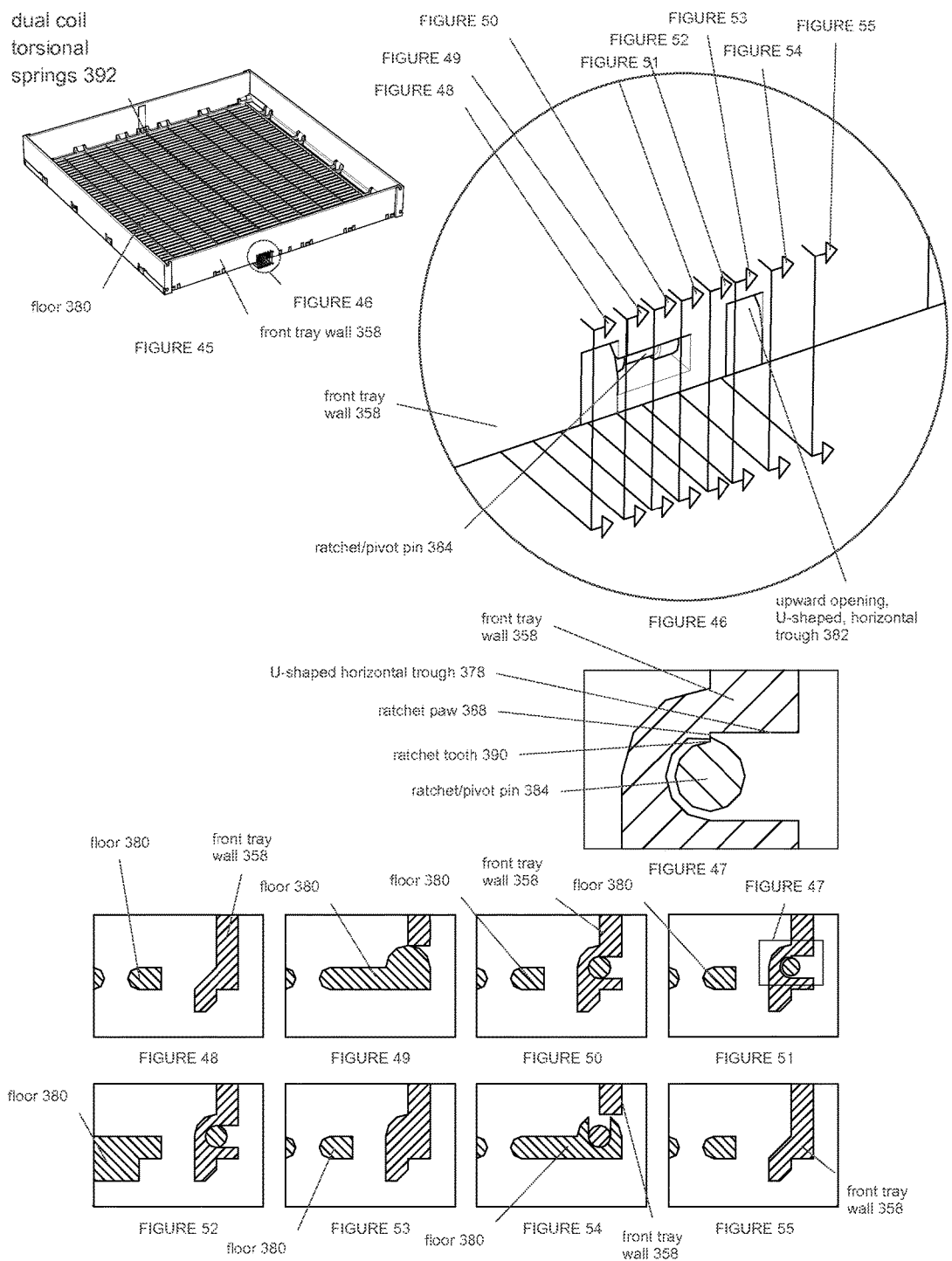

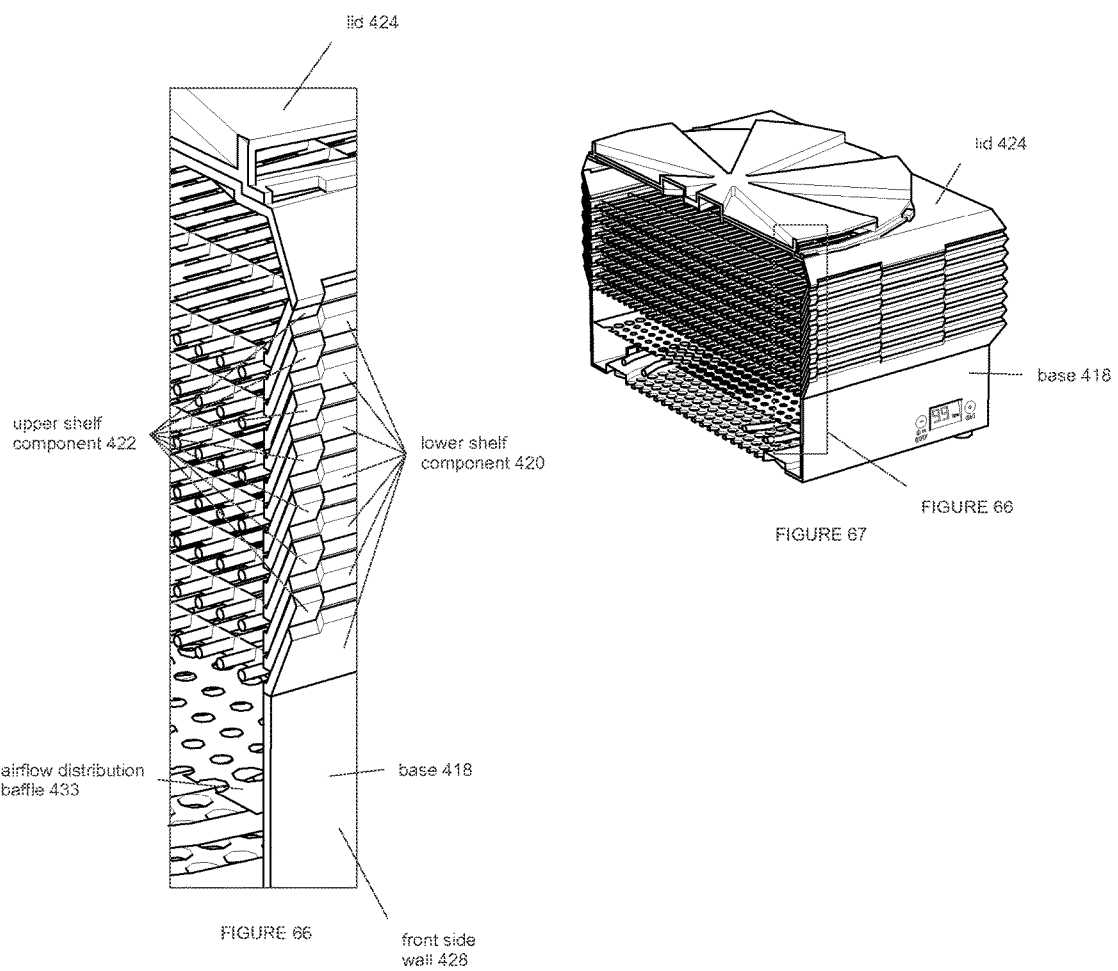

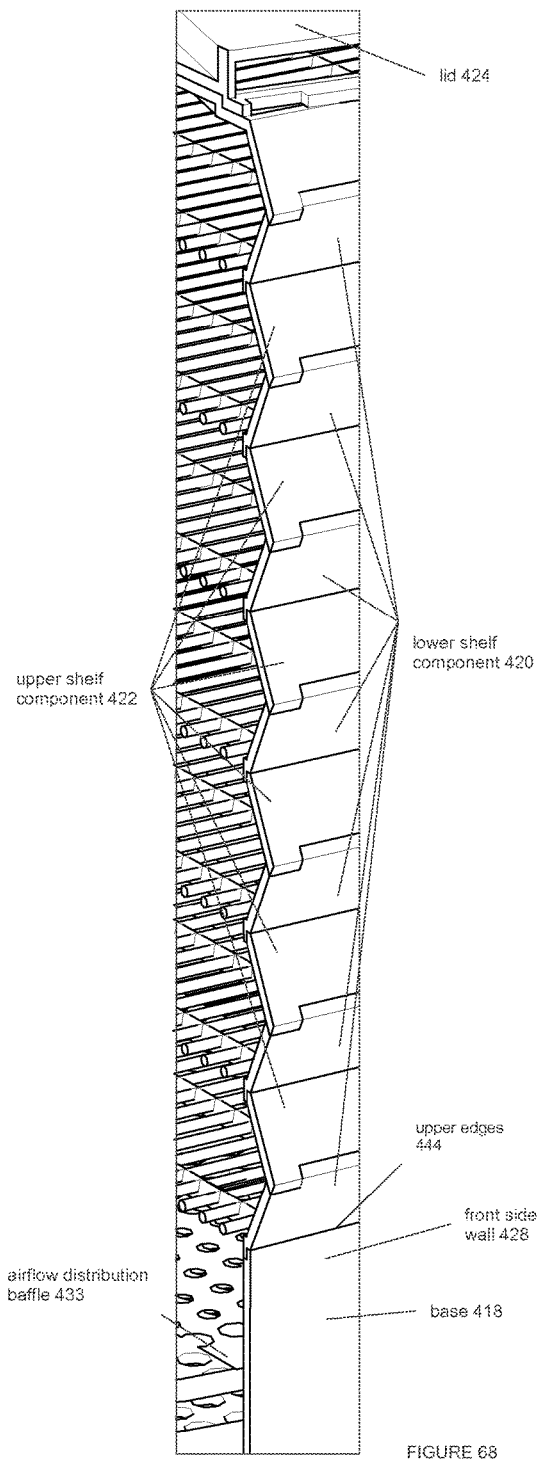
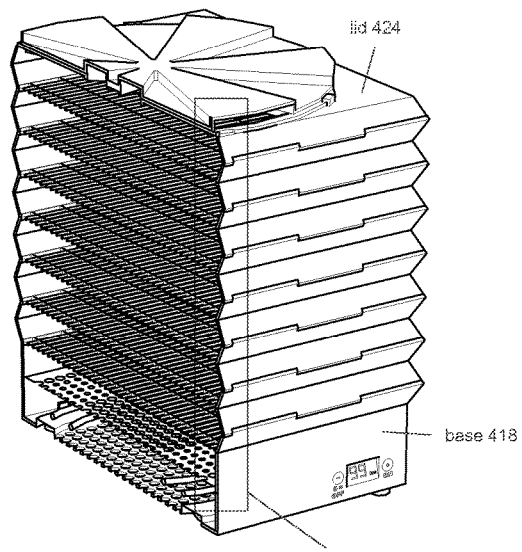
FIGURE 68
FIGURE 69

COLLAPSIBLE FOOD PREPARATION DEVICE

FIELD OF INVENTION

The present inventions relate to food preparation devices using natural flowing and/or fan driven heated air, and details for the construction thereof.

BACKGROUND

Food dehydrators, convection ovens, toaster ovens, small refrigeration units and other food preparation devices using heated air have been quite common for many years. Available units are typically bulky.

The drawings and written materials contained herein describe constructions having advantages which will be recognized by those knowledgeable in the art.

BRIEF DESCRIPTION

Example embodiments disclose herein use stacking trays which can be compacted providing for lowered shipping cost and reduced storage space.

Example embodiments illustrated herein accomplish this compaction through two general structure types.

A first example embodiment structure utilizes straight sided, flat trays with hinged peripheral sidewalls which fold upward for use and downward to a flatter form factor for storage, shipping, or other purposes.

A second example embodiment structure utilizes trays which nest inside each other, similar to stacking drinking cups.

Descriptive specification herein shows details for example embodiments utilizing different construction types.

DESCRIPTION OF FIGURES

FIG. 1 is a perspective view of an example embodiment 101, utilizing stackable, compactable, trays, design 1 103 in their open, in-use, condition.

Figure 1:
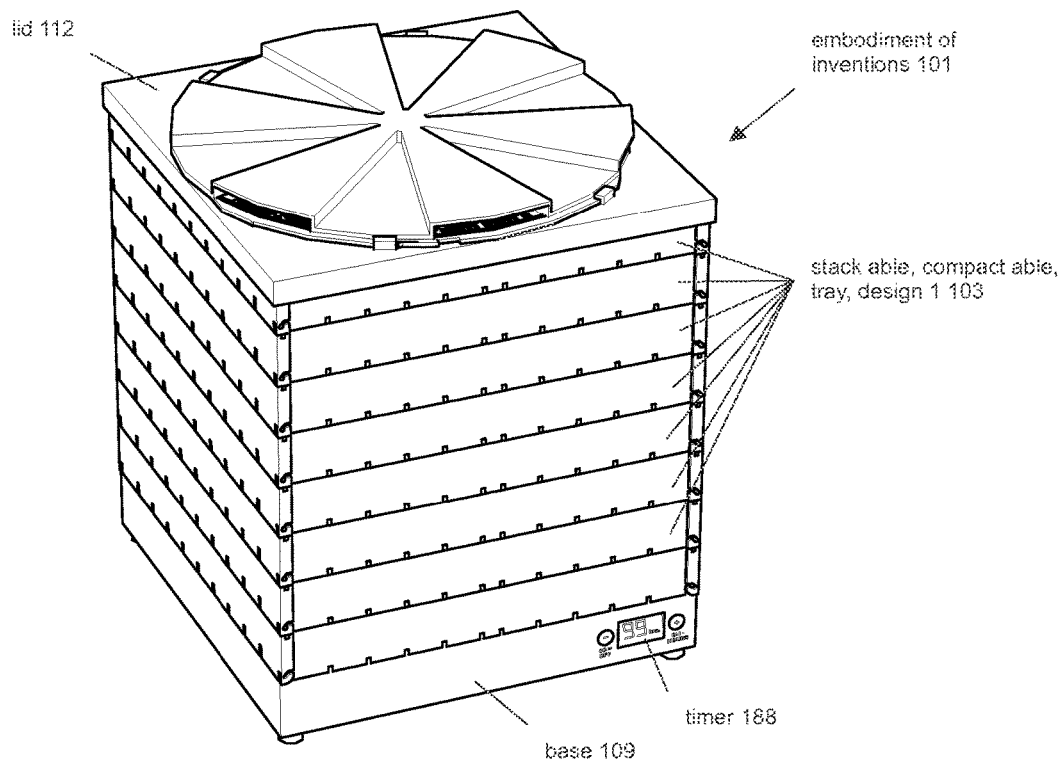
FIGS. 1 through 73 show example embodiments. These example embodiments feature stackable, compactable, trays, design 1 103; stackable, compactable, trays, design 2 105; and stackable, compactable, trays, design 3 107, which are each of different design, but which may each be configured to serve identical functions.

Also shown in FIG. 1 is base 109, and lid 112.

Figure 2:
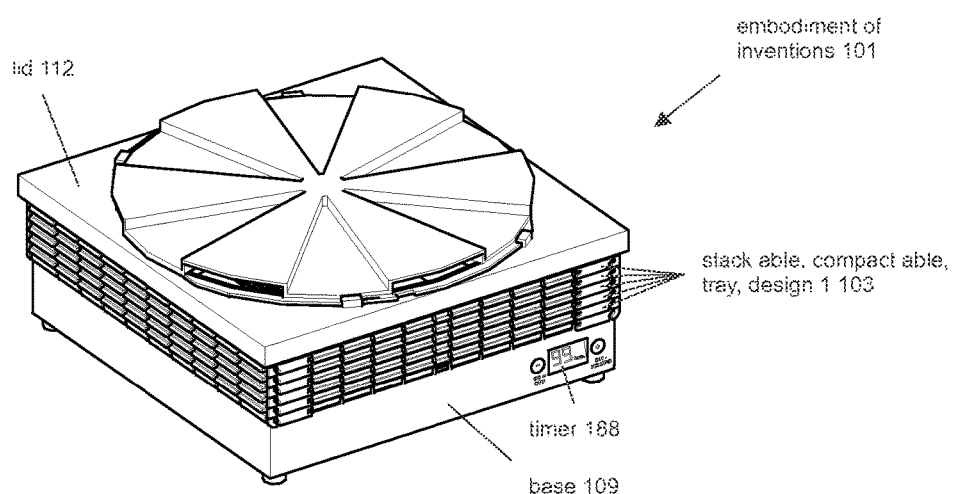

The identical components shown in FIG. 1 are also shown in FIG. 2, with stackable, compactable, trays, design 1 103, in their compacted condition.

Figure 3:
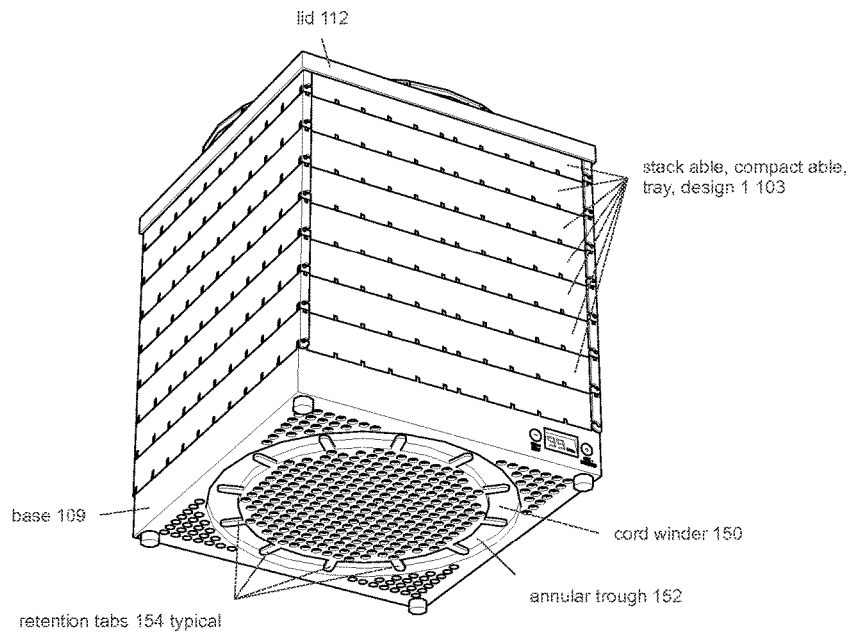

FIG. 3 shows a perspective of example embodiment 101, taken from a viewpoint in front of and below.

Figure 4:
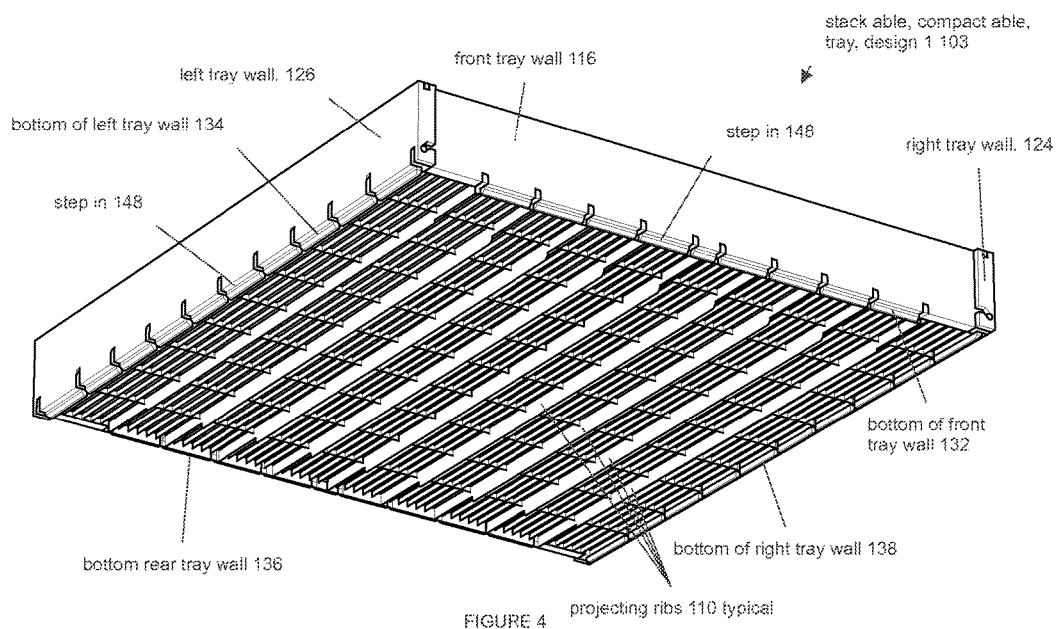

FIG. 4 is a detail perspective is taken from approximately the same viewpoint as FIG. 3, however, FIG. 4 shows only one stackable, compactable tray design 1 103.

FIG. 5 is an exploded perspective of stackable, compactable tray design 1 103, and indicates the viewpoints of FIGS. 6, 7, 8, and 9.

FIG. 5 shows stackable, compactable tray design 1 103, in its open, in-use, condition.

FIGS. 6, 7, 8, and 9 are enlarged viewpoints of FIG. 5, as indicated in FIG. 5.

FIG. 10 is a perspective of stackable, compactable tray design 1 103 in its open, in-use, condition, and also indicates the viewpoints of FIGS. 11, 12, and 14.

FIGS. 11, and 14, are enlarged viewpoints of FIG. 10, as indicated in FIG. 10.

FIG. 12 is a section of FIG. 10, as indicated in FIG. 10.

FIG. 13 is a perspective of stackable, compactable tray design 1 103, in its compacted condition, and also indicates the viewpoints of FIGS. 15 and 16.

Figure 17:
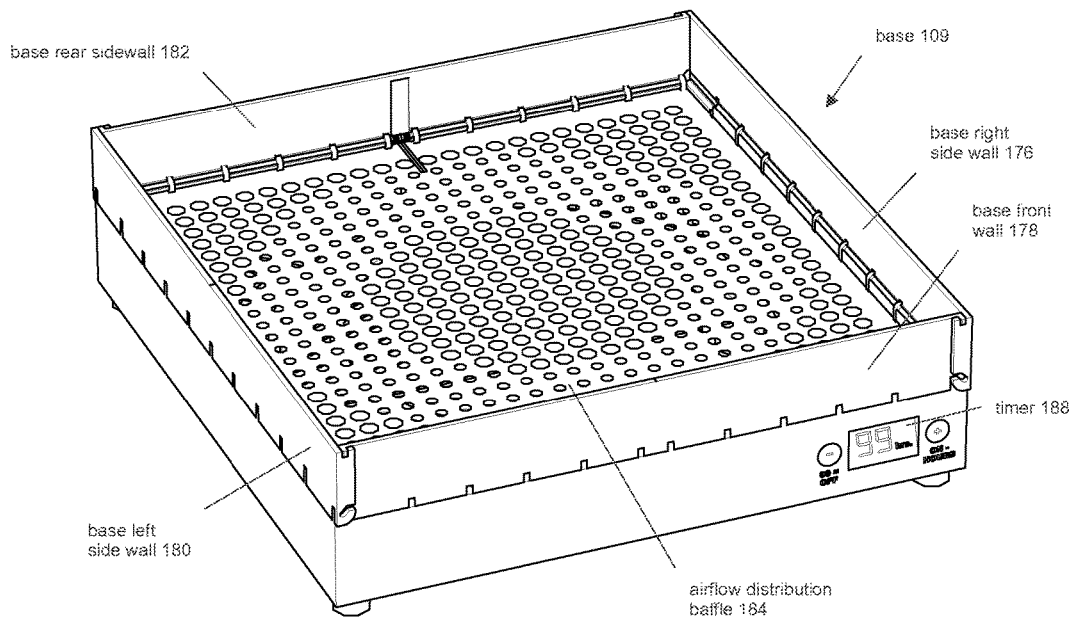

FIG. 17 is a perspective of base 109 in its open, in-use, condition.

Figure 18:
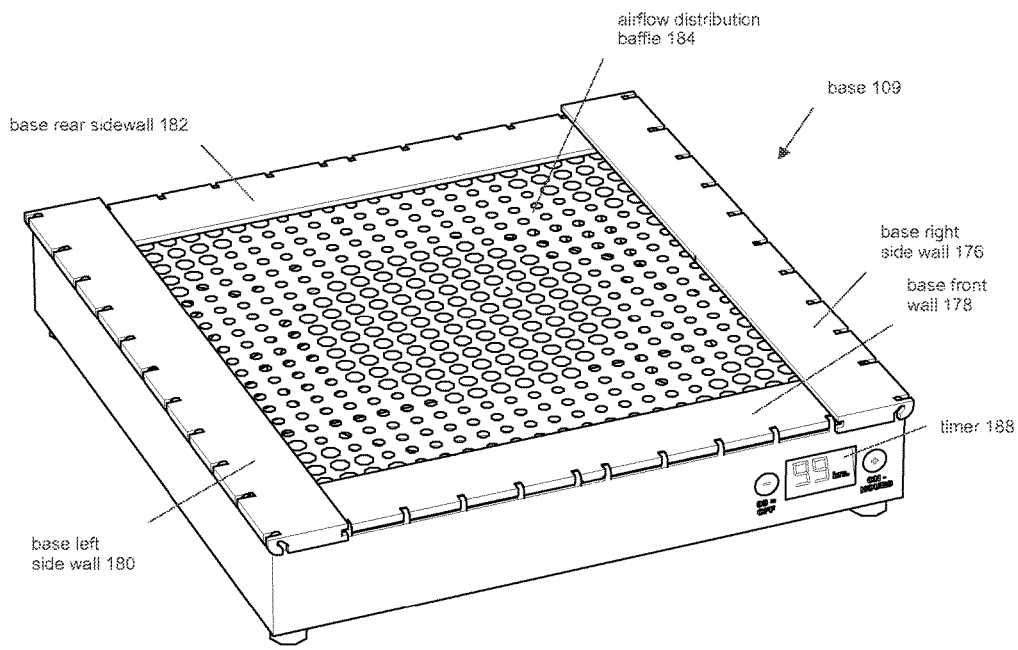

FIG. 18 is a perspective of base 109 in its compacted condition.

Figure 19:
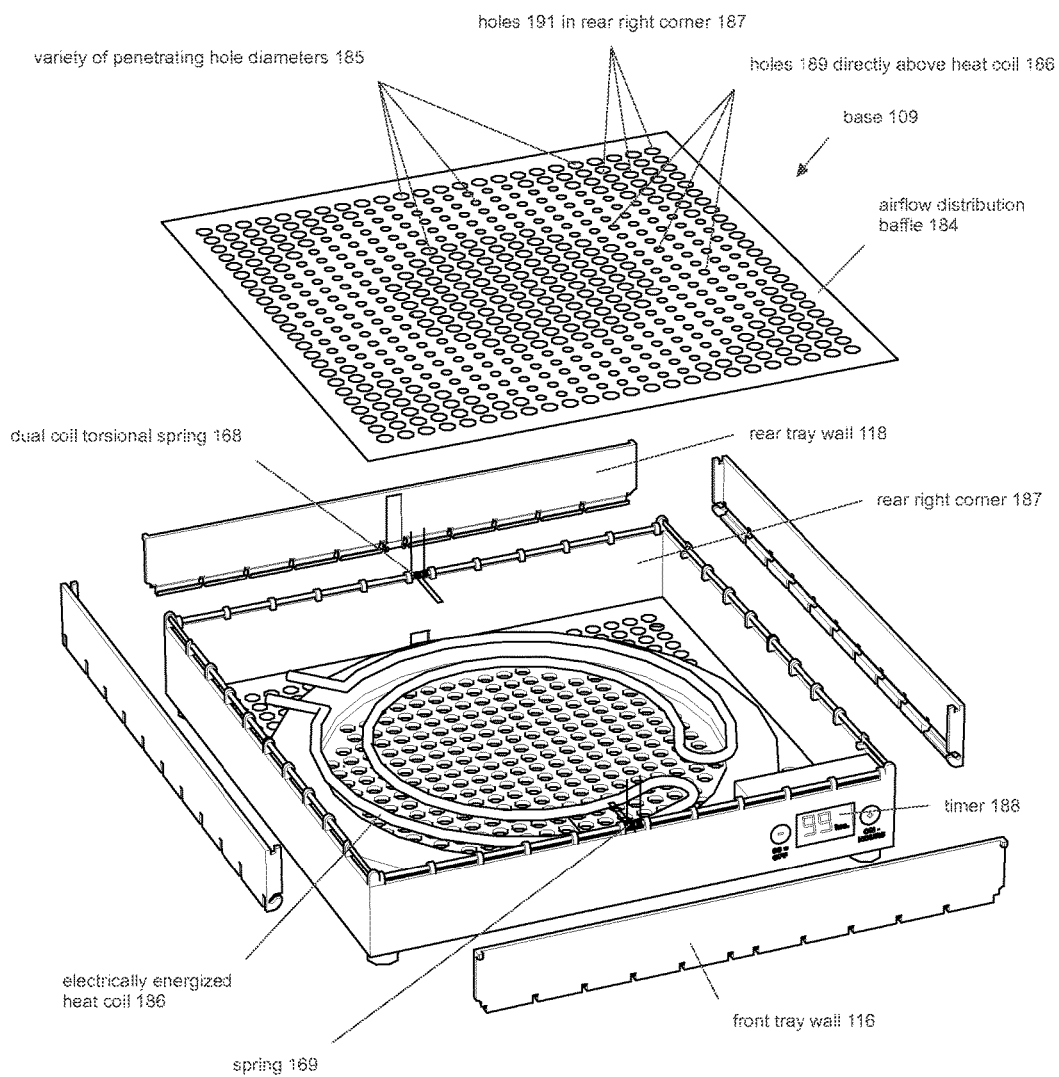

FIG. 19 is an exploded perspective of base 109 in its open, in-use, condition.

FIG. 20 is a perspective view of lid 112.

FIG. 21 is an exploded perspective view of lid 112, viewed from above.

FIG. 22 is an exploded perspective view of lid 112, viewed from below.

FIG. 22 A shows an enlarged portion of FIG. 22, as indicated in FIG. 22.

Figure 23:
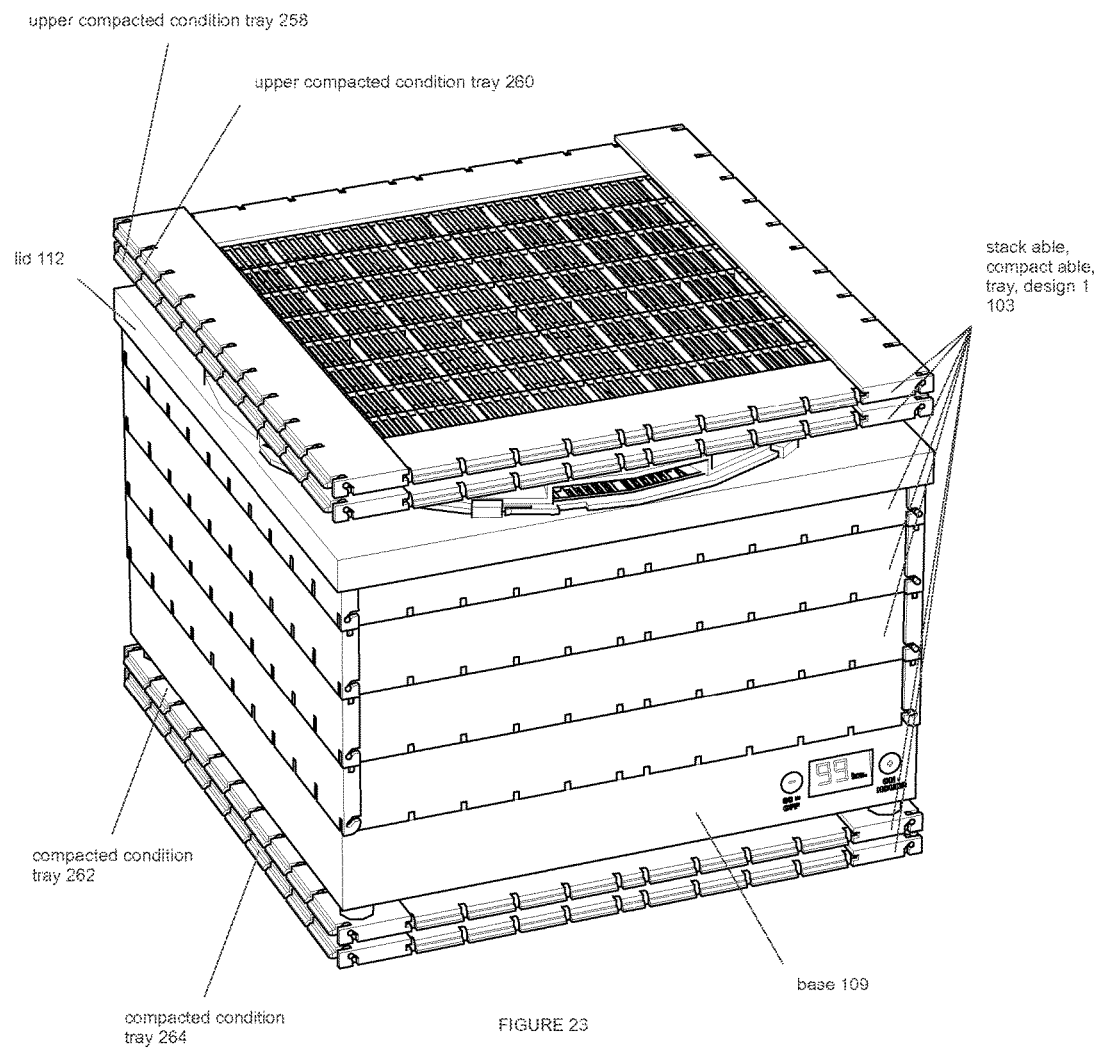

FIG. 23 is a perspective view of of an example embodiment 101 showing stackable, compactable, trays, design 1 103 in their compacted conditions, disposed both above lid 112, and below base 109.

Figure 24:
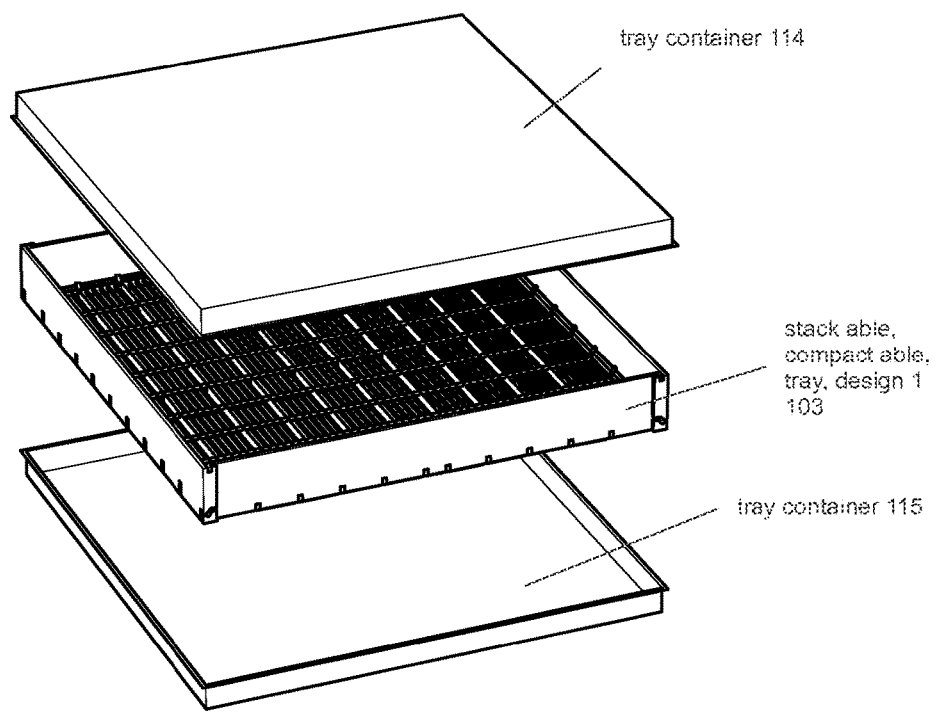

FIG. 24 is an exploded perspective view of stackable, compactable tray design 1 103, in its open, in-use, condition, with tray containers 114 exploded both above and below stackable, compactable tray design 1 103.

Figure 25:
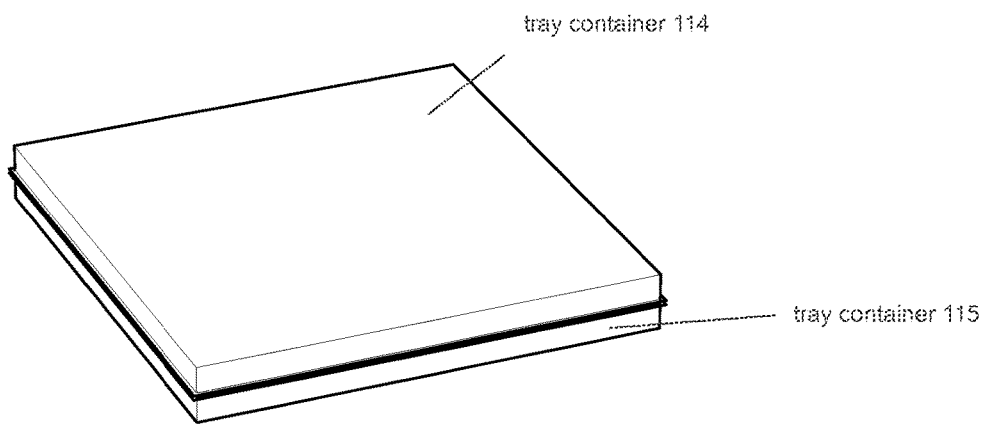

FIG. 25 is a perspective of tray containers 114, in use.

Figure 26:
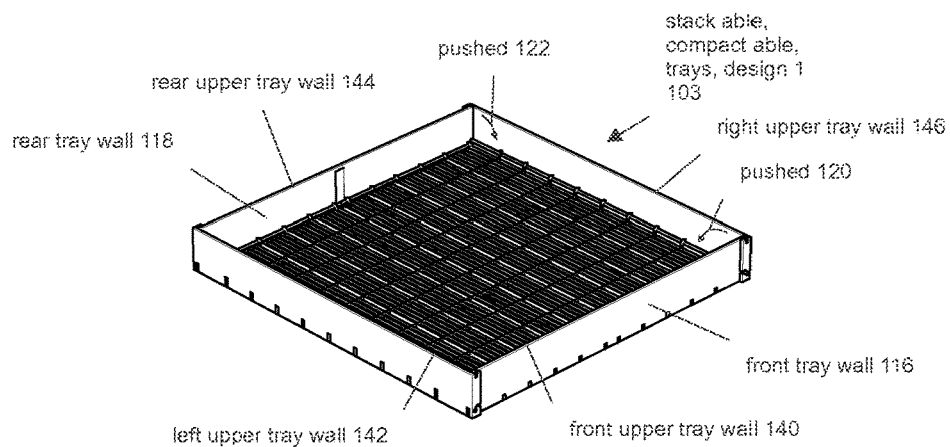
Figure 27:
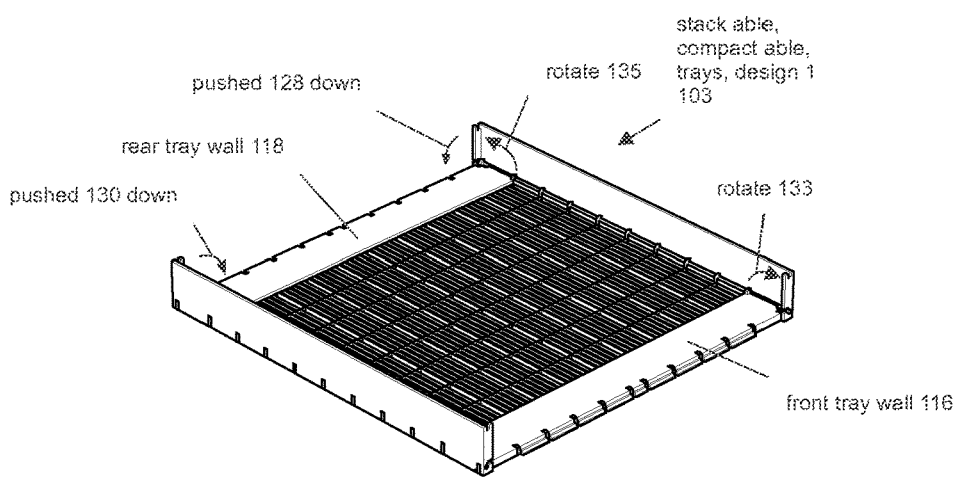
Figure 28:
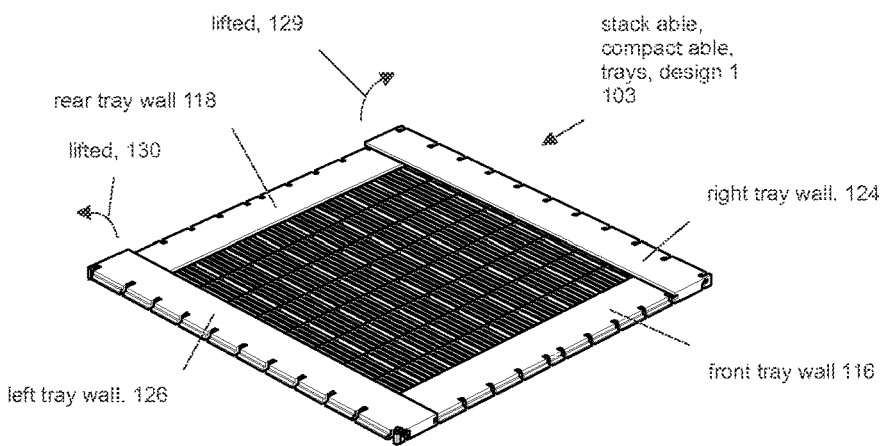

FIGS. 26, 27, and 28, are perspectives illustrating how stackable, compactable, trays, design 1 103, may suitably be closed to their compacted condition (FIG. 28), and opened to their in-use, condition (FIG. 26).

Figure 29:
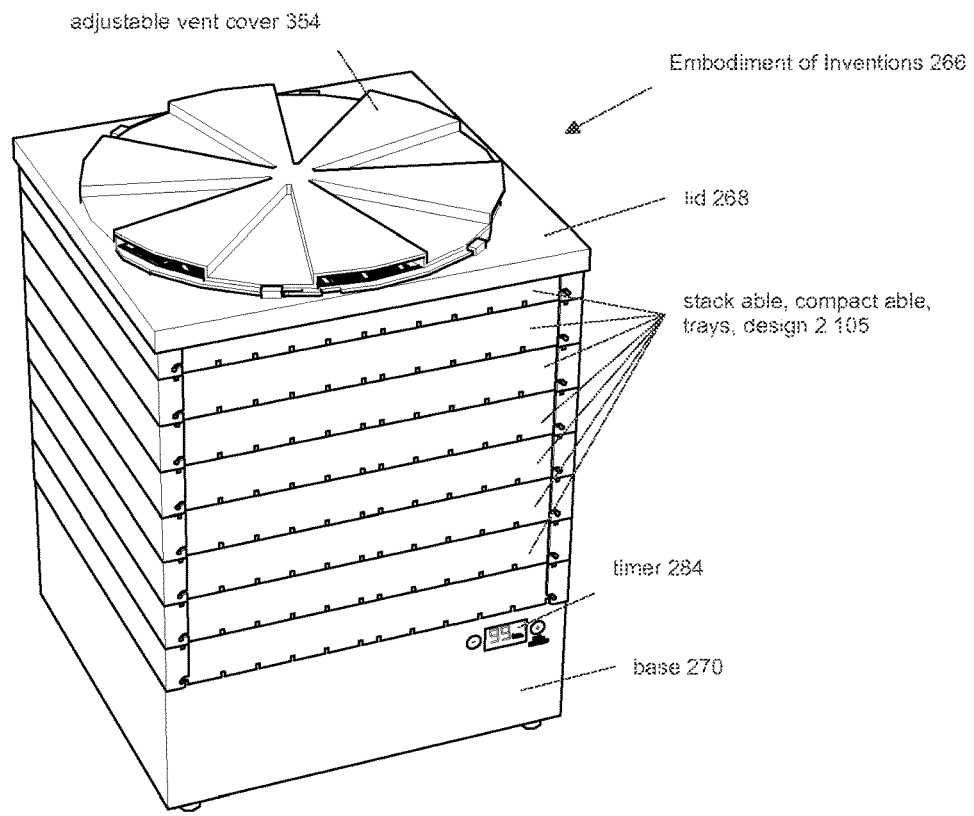

FIG. 29 shows a perspective of an example embodiment 266 in its in-use condition.

Figure 30:
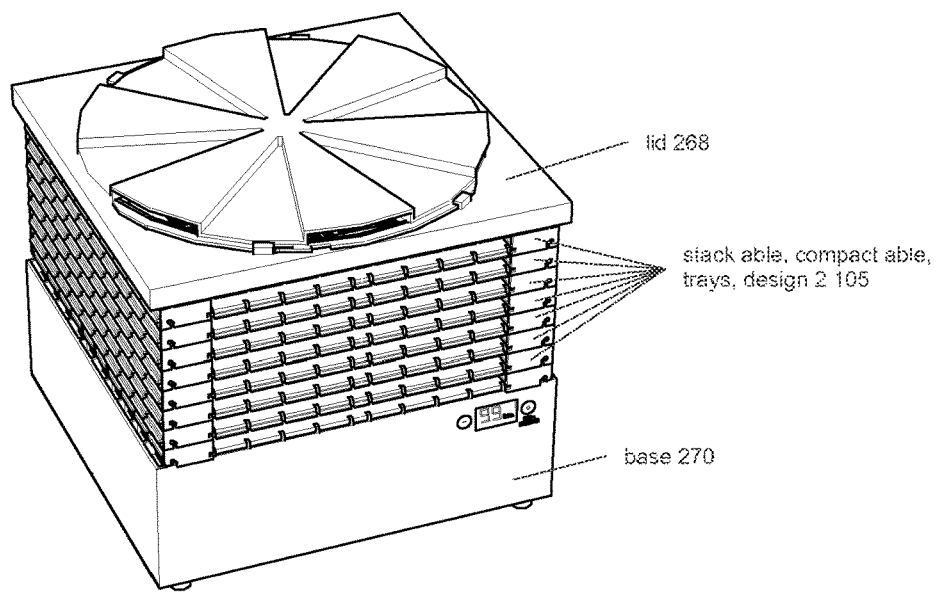

FIG. 30 shows a perspective of an example embodiment 266 in its compacted condition.

Figure 31:
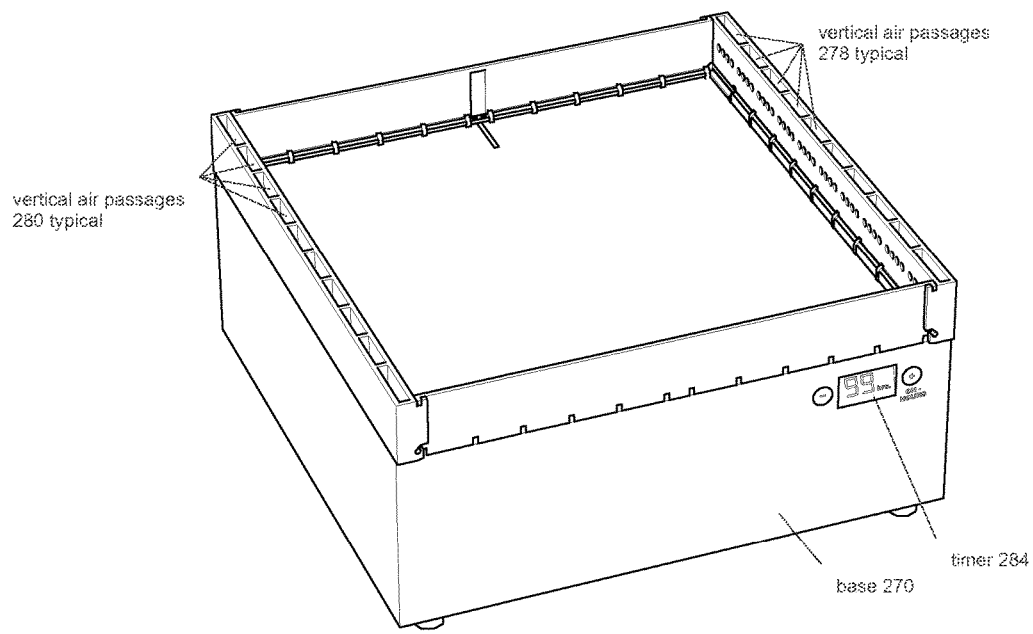

FIG. 31 is a perspective of base 270 in its open, in-use, condition.

Figure 32:
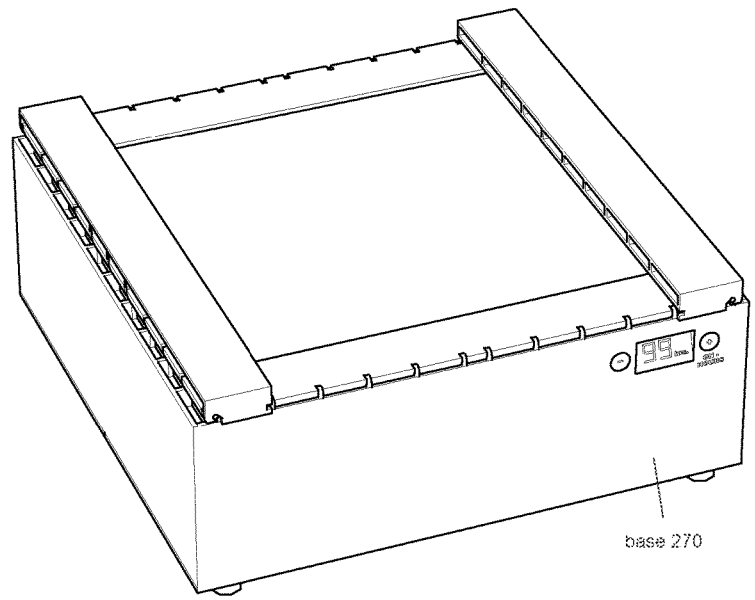

FIG. 32 is a perspective of base 270 in its compacted condition.

Figure 33:
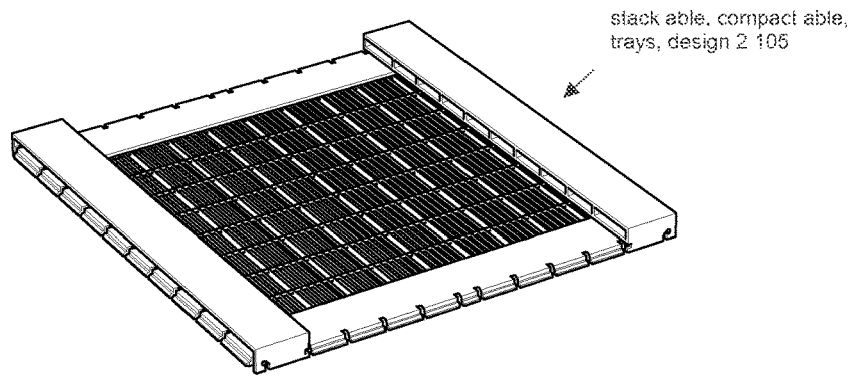
Figure 34:
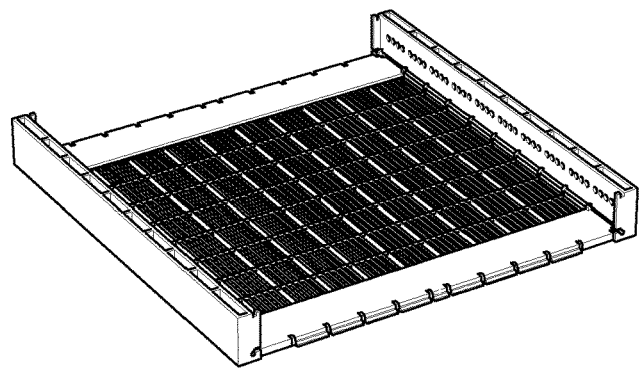
Figure 35:
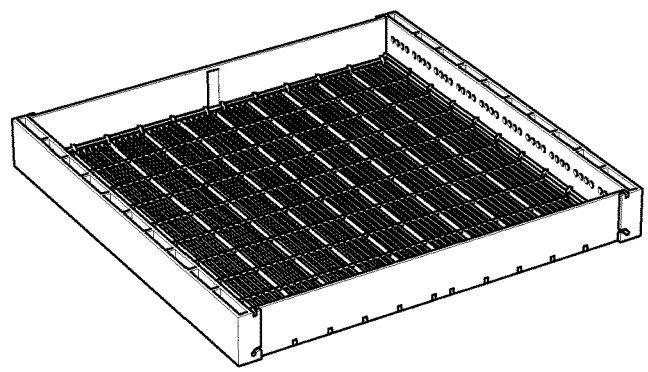

FIGS. 33, 34, and 35, are perspectives illustrating how stackable, compactable, trays, design 2 105 are transitioned from their compacted condition (FIG. 33) to their open, in-use, condition (FIG. 35).

Figure 36:
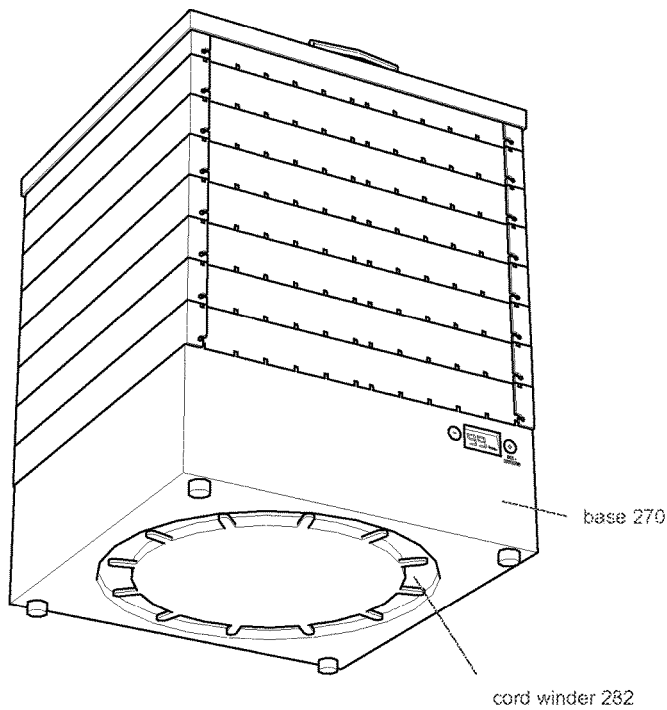

FIG. 36 is a lower perspective of an example embodiment 266.

Figure 37:
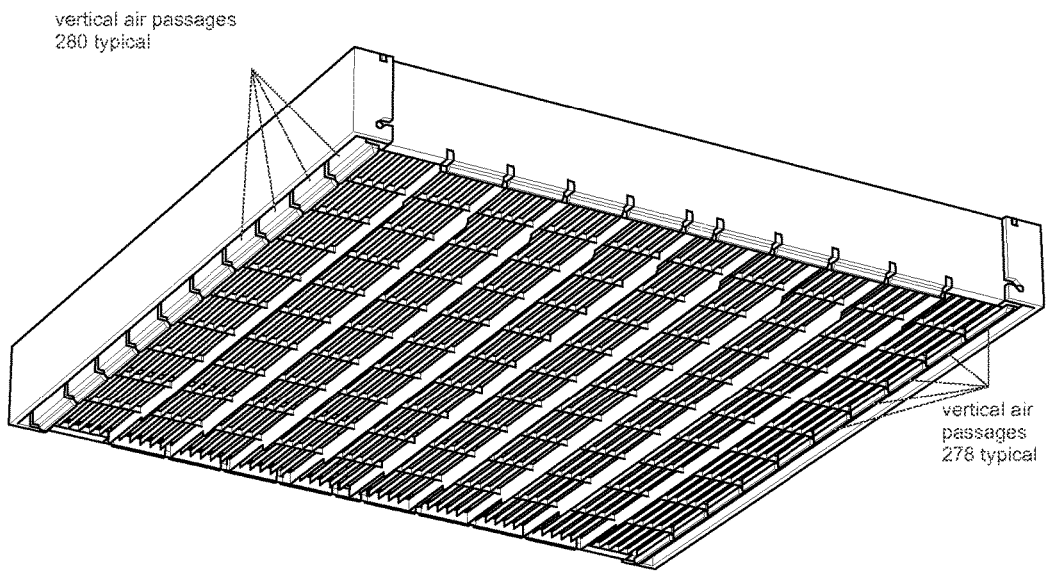

FIG. 37 is a perspective of stackable, compactable tray design 2 105, taken from below.

FIG. 38 is an overhead, exploded perspective of base 270, including stackable, compactable tray design 2 105 and chamber cover 302.

FIG. 39, is a section perspective of assembled FIG. 38, as indicated in FIG. 38.

FIG. 40 is a perspective of air director 272.

FIG. 41 is an exploded perspective, taken from below, of: centrifugal impeller 318, and air path maker 316.

Figure 42:
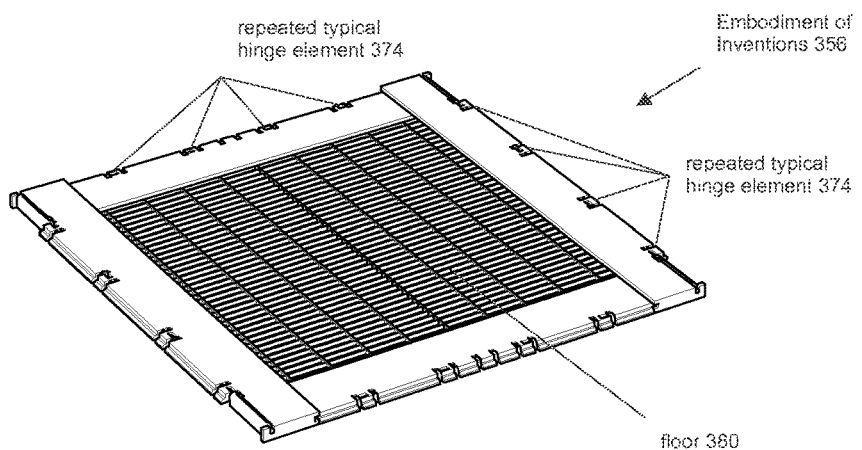
Figure 43:
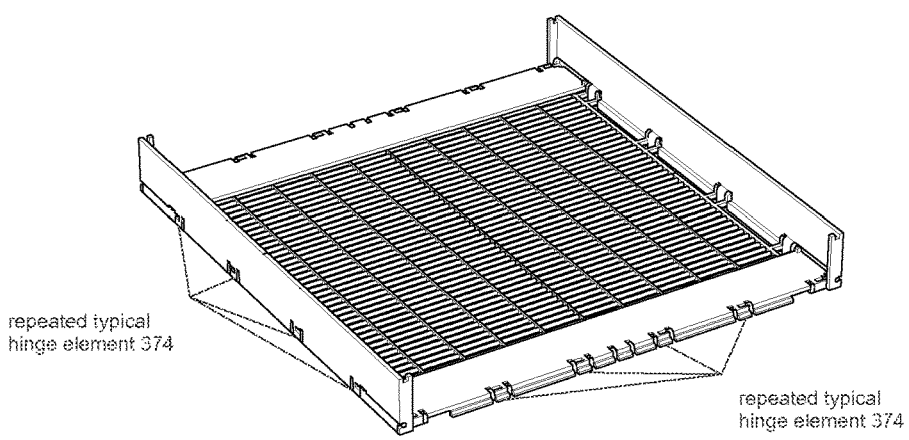
Figure 44:
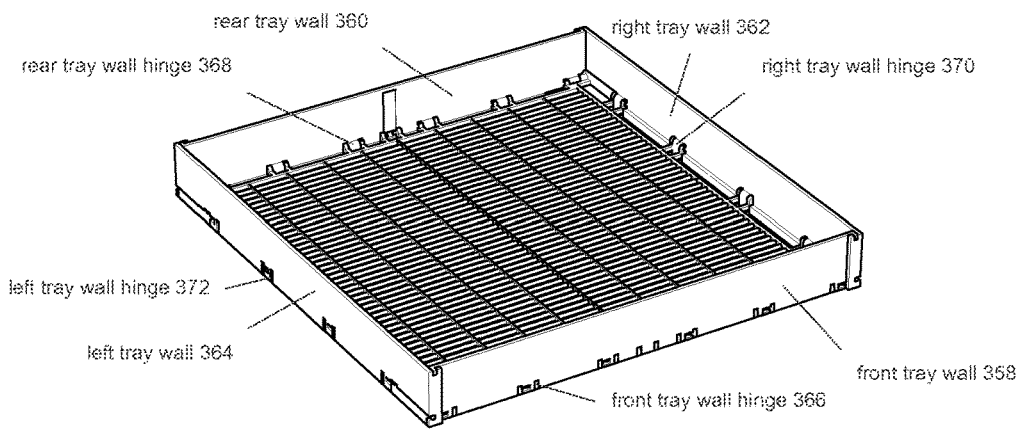

FIGS. 42, 43, and 44, are perspectives, which illustrate how example embodiment 356 transitions from its compacted condition (FIG. 42) to its open, in-use, condition (FIG. 44).

FIG. 45 is a perspective of an example embodiment 356.

FIG. 46 is a detail of FIG. 45, as indicated in FIG. 45.

FIGS. 48 through 55, are sections taken through FIG. 46, as indicated in FIG. 46.

FIG. 47 is a detail of FIG. 51, as indicated in FIG. 51.

Figure 56:
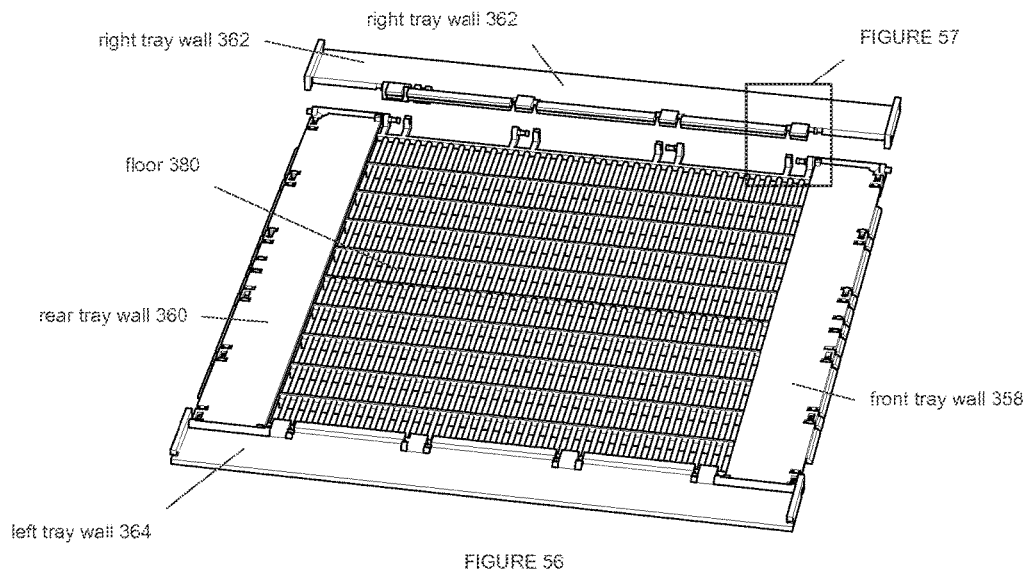

FIG. 56 is a perspective which illustrates example embodiment 356, in its assembly, condition.

Figure 57:
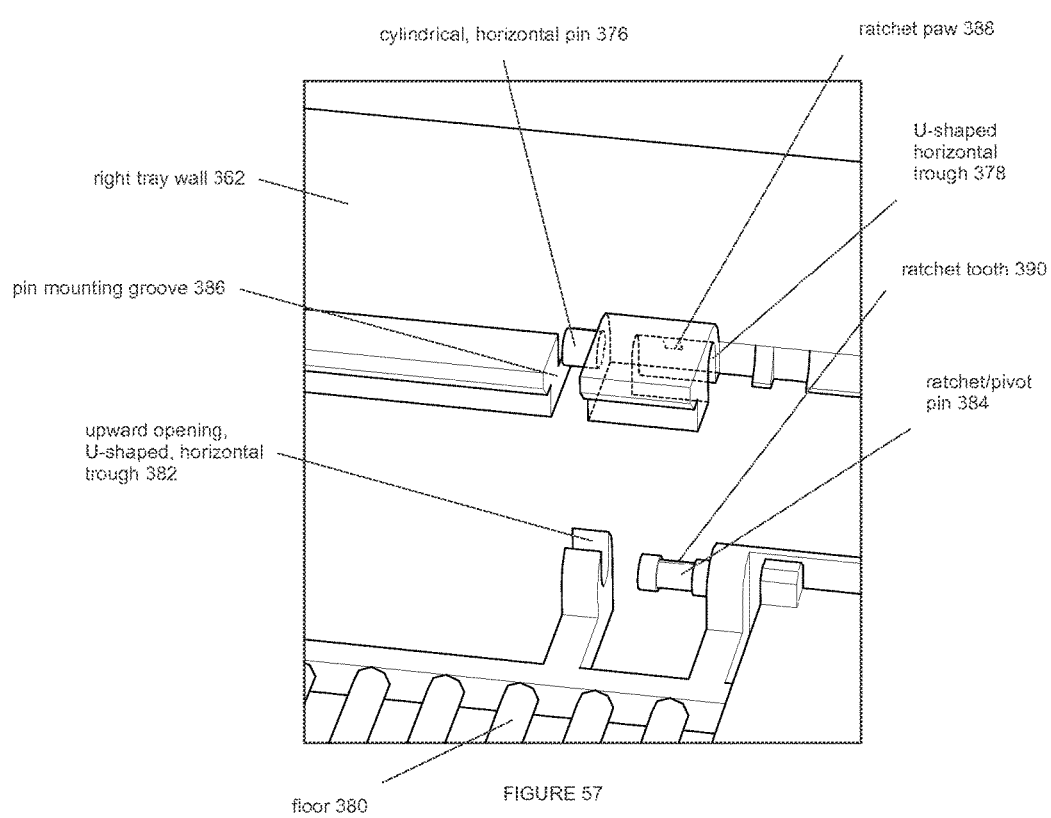

FIG. 57 is a detail of FIG. 56, as indicated in FIG. 56.

Figure 58:
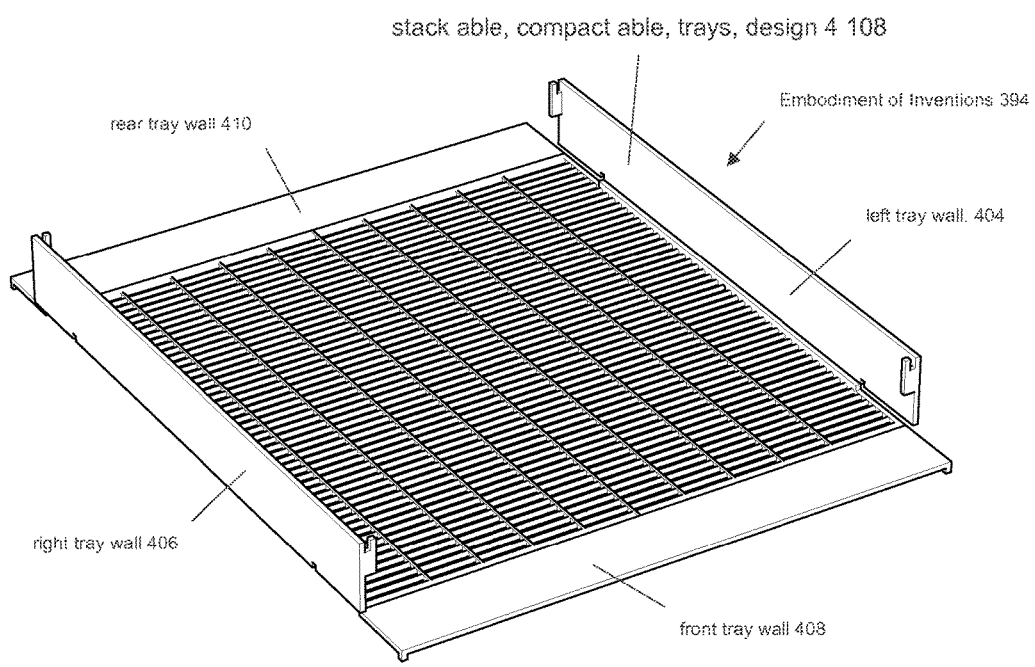

FIG. 58 is a perspective showing an example embodiment 394, as it may suitably emerge directly after molding.

Figure 59:
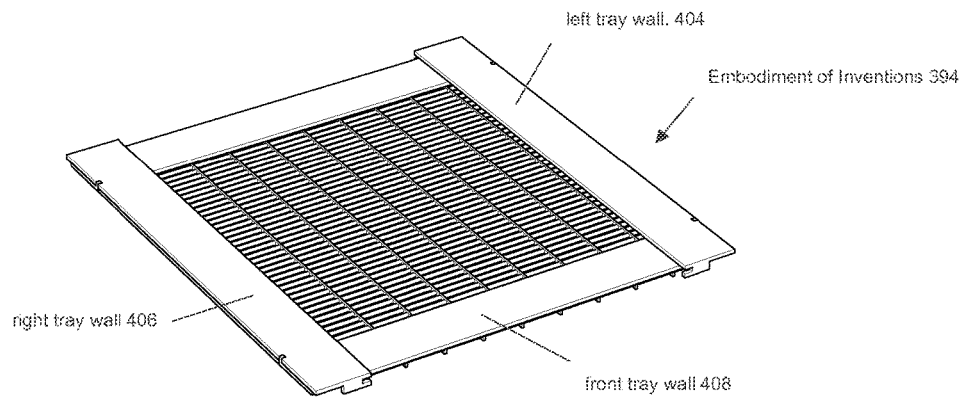
Figure 60:
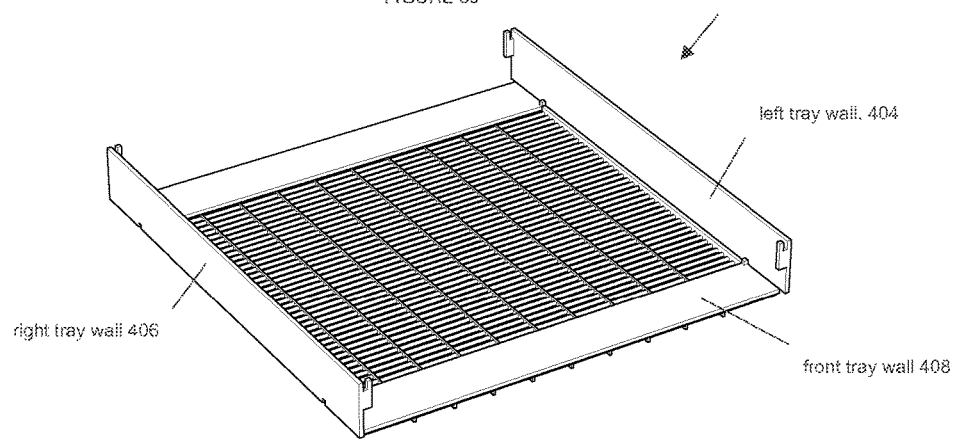
Figure 61:
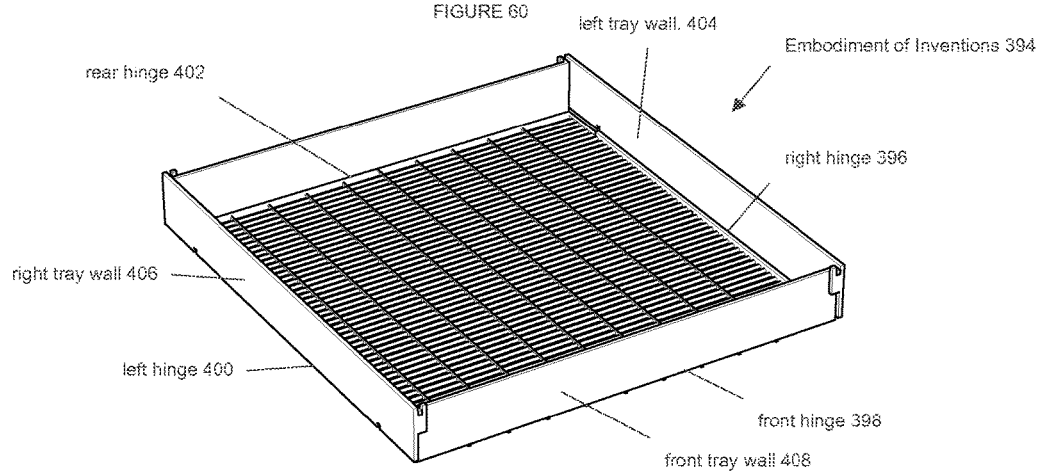

FIGS. 59, 60, and 61, are perspectives which illustrate example embodiment 394 transitioning from its compacted condition (FIG. 59) to its open, in-use, condition (FIG. 61).

Figure 62:
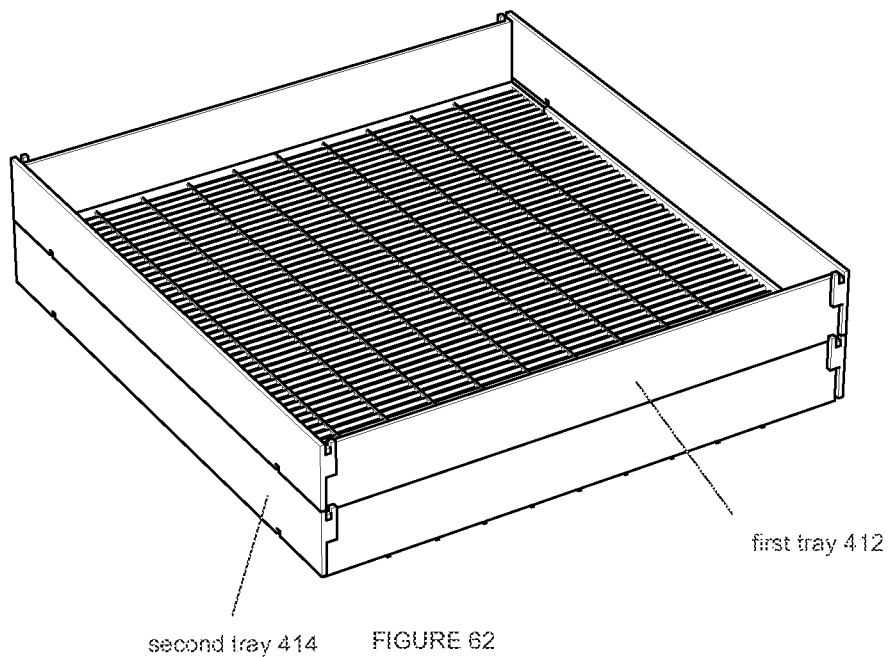

FIG. 62 is a perspective of first tray 412 stacking above second tray 414.

Figure 63:
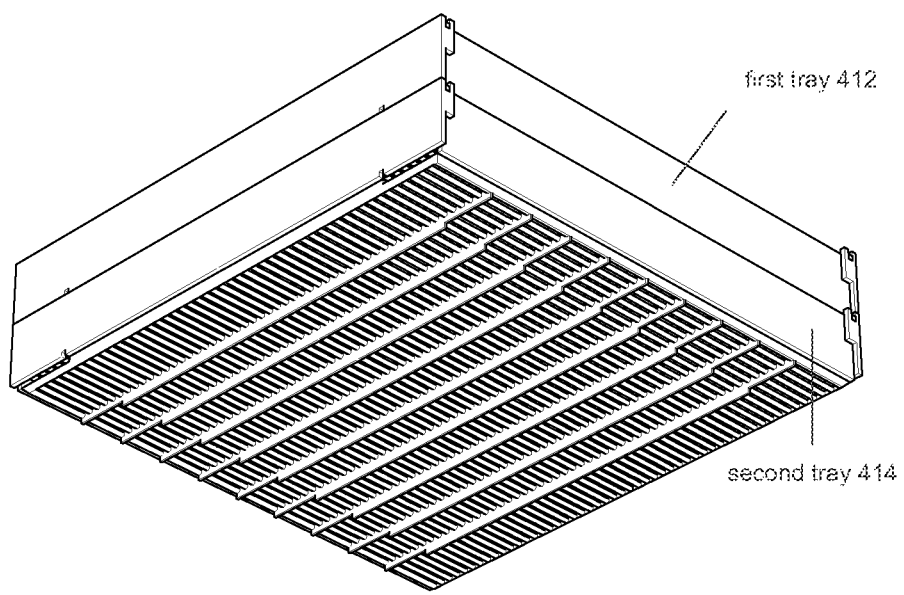

FIG. 63 is a perspective taken from below of first tray 412 stacking above second tray 414.

Figure 64:
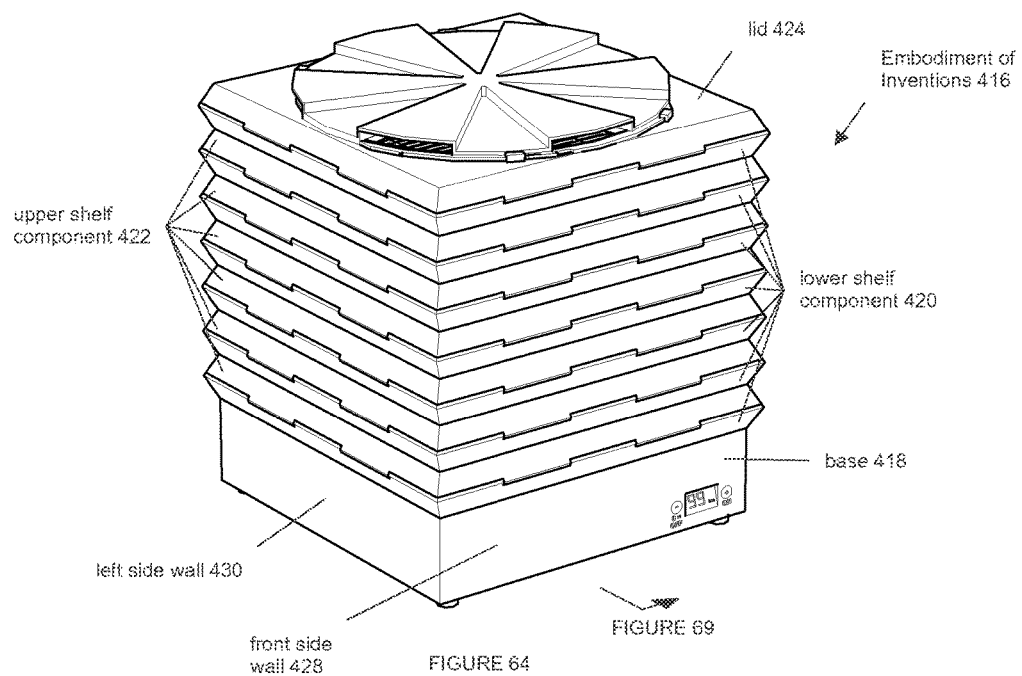

FIG. 64 is a perspective of an example embodiment 416, in its open, in-use condition.

Figure 65:
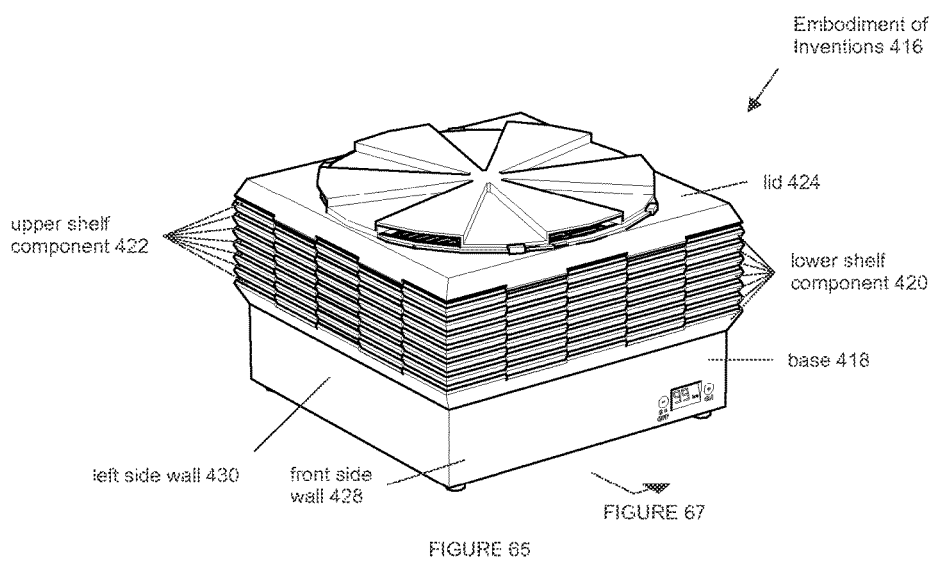

FIG. 65 is a perspective of example embodiment 416, in its compacted condition.

FIG. 66 is a detail of FIG. 67, as indicated in FIG. 67.

FIG. 67 is a perspective section of FIG. 65, as indicated in FIG. 65.

FIG. 68 is a detail of FIG. 69, as indicated in FIG. 69.

FIG. 69 is a perspective section of FIG. 64, as indicated in FIG. 64.

Figure 70:
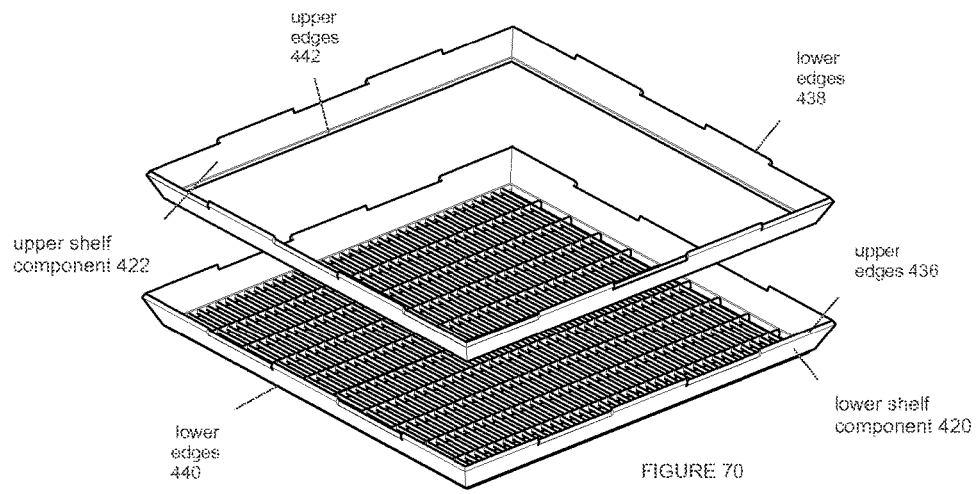

FIG. 70 is a perspective illustrating lower shelf component 420 and inverted upper shelf component 422.

Figure 71:
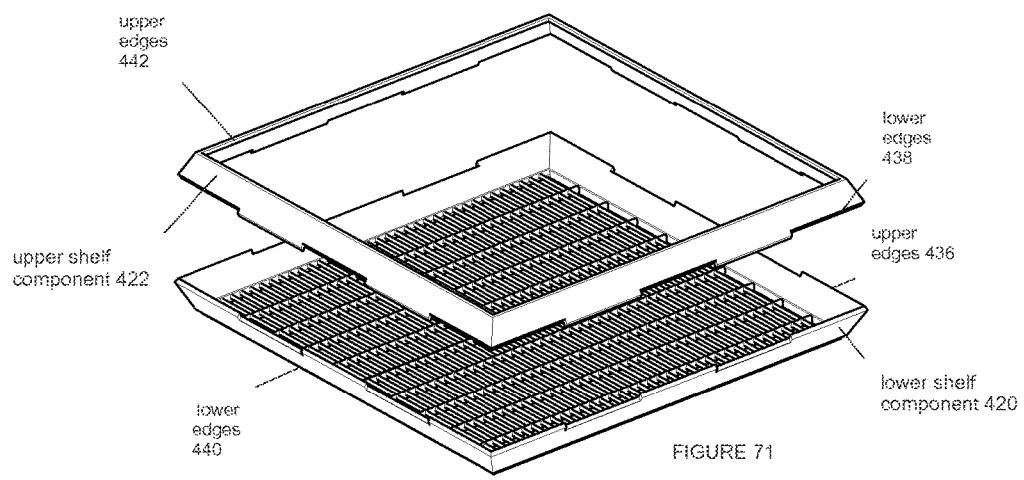

FIG. 71 is a perspective illustrating lower shelf component 420, and upper shelf component 422.

Figure 72:
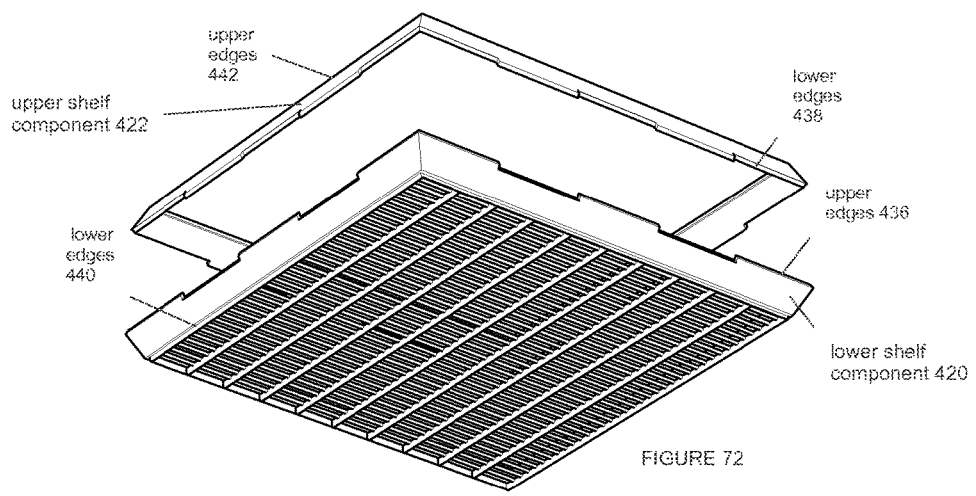

FIG. 72 is a lower perspective view of lower shelf component 420, and upper shelf component 422.

Figure 73:
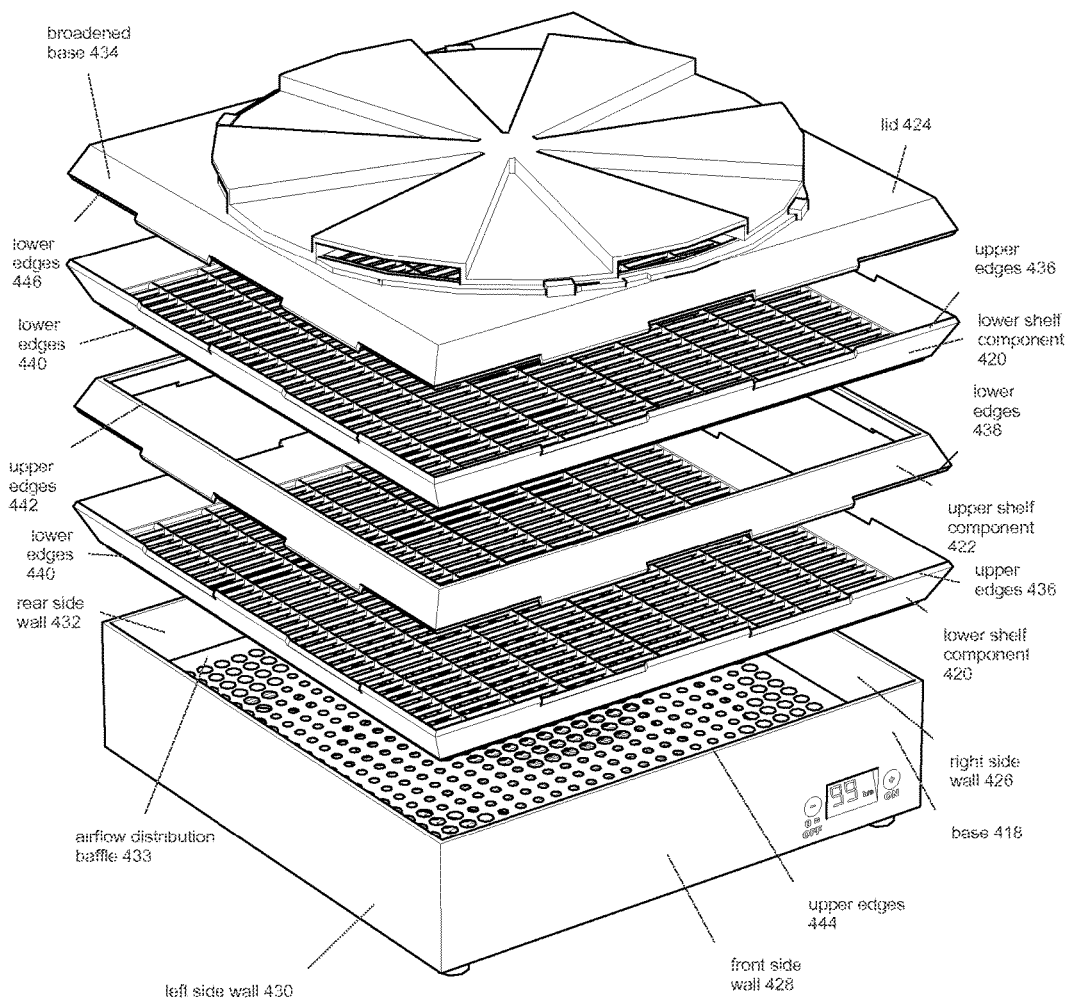

FIG. 73, is an exploded perspective.

DETAILED DESCRIPTION OF EXAMPLE EMBODIMENT 101—FIGS. 1 THROUGH 28

Referring generally to FIGS. 1 through 28, and more specifically to FIGS. 1 and 2, an example embodiment 101 is a non-limiting and non-exhaustive example taught herein and is comprised generally of: lid 112; stackable, compactable tray design 1 103; and base 109. As with other example embodiments taught herein, it can be used for food dehydration, and/or for other food preparation operations utilizing heated air.

FIG. 1 shows example embodiment 101 in its open, in-use, condition,

FIG. 2 shows example embodiment 101 in its compacted condition.

The main difference between FIGS. 1 and 2 is that stackable, compactable, trays, design 1 103 are in their open, in-use, condition in FIG. 1, and they are shown in their compacted condition in FIG. 2.

How this transition takes place is shown in FIGS. 26, 27, and 28.

FIG. 26 shows trays 103 in their open, in-use, condition.

FIG. 27 shows tray 103 with front tray wall 116 and rear tray wall 118 pushed 120 and 122 respectively down.

FIG. 28 differs from FIG. 27 in that right tray wall 124 is pushed 128 down, and left tray wall 126 is pushed 130 down. When right tray wall 124 is pushed 128 down, it snaps into and releasably stays in the down position (FIG. 28).

Transitioning tray 103 from its compacted condition, to its in-use condition, is done by reversing the above process.

First, left tray wall 126, and right tray wall 124, which are shown releasably snapped down flat in FIG. 28, are both lifted, 129 130. This causes front tray wall 116 and rear tray wall 118, under bias from dual coil torsional springs 168 and its mirror image, to rotate 133 135 to their open, in-use condition respectively, where they snap into position, as shown in FIG. 26.

As shown in FIG. 1, trays 103 may stack on top of one another when they are in their open, in-use, condition.

As shown in FIG. 2, trays 103 may stack on top of one another when they are in their compacted condition.

Comparing FIG. 1 with FIG. 2 illustrates how example embodiment 101 may be reduced in size and volume, to at least reduce storage space requirements, and shipping costs.

FIGS. 1, 4, 12 and 26. in particular, show how, when stackable, compactable, trays, design 1 103 are in their open, in-use, condition; bottom of front tray wall 132, bottom of left tray wall 134, bottom of rear tray wall 136, and bottom of right tray wall 138 each step in 148 to nest inside of the inner perimeter of combined: front upper tray wall 140, left upper tray wall 142, rear upper tray wall 144, and right upper tray wall 146, respectively, to form a mechanical interlocking, overlapping couple between one open tray 103 and another open tray 103 stacked below it.

FIG. 3, taken from a viewpoint below, example embodiment 101, shows cord winder 150, which is comprised of annular trough 152, and retention tabs 154 typical, which retard the unwinding of power cord wrapped around the inner side walls of annular trough 152. The purpose of cord winder 150 is to fully or partially store the power cord for example embodiment 101. This may be to shorten the cord length during use, and/or to store the cord, and/or for other purposes.

FIG. 4 is taken from a viewpoint below tray 103 and shows projecting ribs 110 typical, which engage the upper surfaces of compacted condition tray 103 (FIG. 13).

FIG. 5 shows an exploded view of stackable, compactable tray design 1 103. Right hinge 156, front hinge 158, left hinge 160, and and rear hinge 162 are disposed at the bases of: right tray wall. 124, front tray wall 116, left tray wall. 126, and rear tray wall 118 respectively.

Right tray wall 124 is shown as identical to left tray wall 126. Both are symmetrical front to back 164.

Front tray wall 116 is shown as identical to rear tray wall 118. Both of these are symmetrical 166 side to side.

Stackable, compactable tray design 1 103, is shown as being square. When stacking one square open tray, design 1 103 on top of another, unlike with a rectangular plan shape, where one set of opposing sides is longer than the orthogonal other sides, there is no need in plan view to rotationally orient one square tray 103 above the other. Any of the possible 90 degree orientations will work.

Dual coil torsional spring 168 is shown in FIG. 5, and biases rear tray wall 118 toward its open, in-use disposition, as shown in FIGS. 10 and 19. Spring 168 is mirror imaged 169 on the front side of floor 170 to bias front tray wall 116 toward its open, in-use disposition.

Hinges 156, 158, 160, and 162 are constructed by snapping cylindrical rod members 172 typical, into U-shaped elongated grooves 174 typical—FIGS. 9 and 12.

Many other hinge constructions may be used, alone or in combination, as substitutes for this construction. As non-limiting and non-exhaustive examples, a common door hinge construction, with a central axle pin may suitably be used, or a living hinge constructed using locally thinned pliable material such as polyethylene or polypropylene may suitably also be substituted.

FIGS. 17, 18 and 19 give details of the construction base 109. Base right side wall 176, base front side wall 178, base left side wall 180, and base rear side wall 182, are shown constructed similar to right tray wall 124, front tray wall 116, left tray wall 126, and rear tray wall 118, respectively.

Functionally, walls, 176 178, 180 and 182 on their upper portions engage trays 103, in a similar manner to the way a top of a tray 103 would.

Airflow distribution baffle 184 (FIGS. 17, 18 and 19), through using a plurality of penetrating holes in its sheet-like surface, some of which are larger diameter than others, and/or are placed closer or farther apart from one another, and/or of different geometric shapes and/or of different geographic positioning, help to even out upward hot air movement.

As a non-limiting and non-exhaustive example, airflow from electrically energized heat coil 186 (FIG. 19) would normally be much hotter directly above heat coil 186, than in its rear right corner 187 (FIG. 19). By making holes 189 directly above heat coil 186 smaller in diameter than holes 191 in rear right corner 187 of baffle 184, hot upward airflow is reduced directly above heat coil 186, and hot upward airflow in rear right corner 187 is increased, thus evening out air temperatures transmitted to trays stacked on base 109.

Any variable hole design may be used. The principle is that such a design makes it easier for air to flow through one section of airflow distribution baffle 184, than through another section.

In general, baffle 184 can accomplish horizontal evening out of upward airflow by varying penetrations, its surface so that air flows easier through one portion of baffle 184, than through one and/or more other portions. The same technique of varying penetrations in baffle 184 surfaces may be used, if as a non-limiting and exhaustive example, it may be desirable to have more airflow through the center of baffle 184 than through its periphery.

Timer 188 suitably shuts off power to heat coil 186, after a user set time interval.

Lid 112 is comprised of vented cover 190, and removable, adjustable vent cover 192.

Vented cover 190 engages removable, adjustable vent cover 192, through horizontal retention ribs 194 196 198 200, being seated below cover retainers 202, 204, 206 and 208 (FIGS. 20, 21, 22). Slots 210 and 212, and spaces between horizontal retention ribs 214 and 260, allow removable, adjustable vent cover 192, to be freely placed on top of vented cover 190. Rotating vent cover 190 counter clockwise 219 then causes horizontal retention ribs 194, 196, 198 and 202 to slide beneath, and be retained under horizontal retention ribs 194, 196, 198 and 200.

After such mounting, counter clockwise 219 and clockwise 218 rotation of rotating removable, adjustable vent cover 192 causes pie shaped vent hole covers 222, 224, 226, 228, 230 and 232 to block to varying degrees vent openings 246, 248, 250, 252, 254 and 256, thus regulating the amounts of air allowed to enter and leave example embodiment 101. This in turn may control the amount of heat and/or airflow within example embodiment 101.

Retainer ratchet paw 220 prevents counter-clockwise rotation 219 of removable, adjustable vent cover 192, until paw 220 is finger depressed 221, and thus allows counter-clockwise rotation 219 and consequently permits removable, adjustable vent cover 192 to be removed from vented cover 190.

Pie shaped vent roof covers 234, 236, 238, 240, 242 and 244 permit pie shaped vent openings 246, 248 250, 252, 254 and 256 to freely vent, when the roof covers are above the vent openings.

This roof-like arrangement helps prevent rain and debris from freely entering example embodiment 101, when it is used outdoors, or at other times.

Screen covers may be placed blocking pie shaped vent openings 246, 248, 250, 252, 254 and 256. Such covers may impede insect and/or debris from entering into example embodiment 101, when it is used outdoors, or at other times.

As non-limiting and non-exhaustive examples, lid 112, trays 103, and/or base 109 may be made transparent, translucent, or of a dark color to permit indoor and/or outdoor sunlight power to augment, or fully power example embodiment 101 operations. This is true for all example embodiments taught herein.

FIG. 23 gives two non-limiting and non-exhaustive examples of how stackable, compactable, trays, design 1 103, may suitably be stored in their compacted condition, when they are not being used in their open, in-use, condition.

In FIG. 23, upper compacted condition trays, 258 and 260 are shown being stored on top of lid 112. Lid 112 and trays 258 and 260 are configured so that trays may be stored in such a manner, and so that such storage does not interfere with example embodiment 101 in-use operations, when such storage occurs.

Also in FIG. 23, compacted condition trays 262 and 264 are shown being stored below base 109. Compacted condition trays, 262 and 264 as well as base 109 are configured so they may suitably be stored in such a manner and so that such storage does not interfere with example embodiment 101 in-use operations, when such storage occurs.

FIGS. 24 and 25 show how tray containers 114 and 115 may suitably be used to facilitate food storage, before, or after food preparation with example embodiment 101, or at other times. As shown in FIGS. 24 and 25, these open-box like structures 114 115 may suitably cover the tops, and/or bottoms of example embodiment 101 trays. During such coverage, tray containers 114 and/or 115, and covered tray 103, may suitably be stored, as non-limiting and non-exhaustive examples, in the open, in a refrigerator, or in a freezer. Tray containers 114 and 115 may suitably be identical in configuration, or they may suitably have different configurations from one another, as a non-limiting and non-exhaustive example, to better suit their fits on the tops and bottoms of tray 103.

It is easy to see that tray containers 114 and 115, may suitably, with obvious modifications, be used on other example embodiments herein.

DETAILED DESCRIPTION OF EXAMPLE EMBODIMENT 266—FIGS. 29 THROUGH 41

FIGS. 29 through 41 show an example embodiment 266. Example embodiment 266 is generally comprised of: lid 268; stackable, compactable trays, design 2 105, and base 270. Example embodiment 266 uses fan driven hot air to prepare food, as a non-limiting and non-exhaustive example, to dehydrate food. An air director 272 causes the fan driven hot air, first in one direction, and then in the opposite direction, over foods resting on trays 105.

Lid 268 is generally configured in a similar manner to lid 112, with corresponding elements performing corresponding functions.

Stackable, compactable, trays, design 2 105, are constructed in a similar manner to stackable, compactable, trays, design 1 103 except in tray design 2 105, new right tray wall. 274, and new left tray wall 276 include vertical air passages 278 typical, and vertical air passages 280 typical, respectively.

Base 270, as shown in FIG. 36, includes cord winder 282, which is similar in construction and function to cord winder 150.

Base 270 also includes timer 284, which shuts off power to the unit after a user preset interval.

Housed within base 270, are heat coil 286, and air director 272.

Upper portion 288 of base 270, is constructed in a similar or identical manner to that used for the sidewalls of stackable, compactable, trays, design 2 105, with right base sidewall 290, left base sidewall 292, front base sidewall 294, and rear base sidewall 296 being analogous to: right tray wall 274, left tray wall 276, front tray wall 292, and rear tray wall 294 respectively.

Central base dividing wall 300, and chamber cover 302 subdivide the lower interior of base 270 into right chamber 296, and left chamber 298, as shown in FIG. 39.

Heat coil 286 heats air within both right chamber 296 and left chamber 298.

Right chamber 296, vents to right base sidewall 306 and to trays stacked above it, through right egress/ingress vent 304 typical.

Left chamber 298 vents to left base sidewall 308, and to trays stacked above it, through left egress/ingress vent 310 typical.

Air director 272 is comprised of: motor 312, reduction gear train 314, air path maker 316, and centrifugal impeller 318 (FIG. 40 in particular).

Affixed centrally on the bottom of centrifugal impeller 318 is primary gear 320 (FIGS. 40 and 41 in particular). As shown, reduction gear train 314 is a single one piece gear assembly, with large outer gear 322, and small central gear 324. If more gear reduction is desirable, this construction may be replaced with a common cascading, rotation rate reducing, gear train, such as commonly found in many appliances.

Primary gear 320 engages large outer gear 322. Small central gear 324 engages air path maker large outer gear 326.

Air path maker 316 is bearing mounted to motor shaft 328, and uses motor shaft 328 as an axle only. Thus, air path maker 316, although coaxial with motor shaft 328, rotates independently of motor shaft 328.

Primary gear 320 is affixed centrally to the bottom of centrifugal impeller 318, which is affixed to, and rotates with, motor shaft 328.

In operation, motor 312, rotates primary gear 320, which through its engagement with large outer gear 322, causes small central gear 324 to rotate, which in turn, through its engagement with air path maker large outer gear 326, causes air path maker 316 to rotate at a gear reduced rate.

Concurrent with this, motor 312 directly rotates centrifugal impeller 318, thus urging air from its interior to its peripheral exterior.

This causes air director 272 to pull air through pie shaped opening 330, and to push air out of air path maker sidewall opening 332.

Air director 272 is centrally mounted in opening 334, which penetrates through central base dividing wall 300 with enough clearance to allow free rotation of air path maker 316, primary gear 320, and centrifugal impeller 318.

As air path maker 316 rotates at gear reduced speeds, pie shaped opening 330 first rotates into, and then out of, right chamber 296, and alternately into and then out of left chamber 298.

Likewise, air path maker sidewall opening 332, mounted on air path maker 316 180-degrees away from pie shaped opening 330, rotates into and out right chamber 296 and left chamber 298, exactly opposite pie shaped opening 330. So when air path maker sidewall opening 332 is in right chamber 296, pie shaped opening 330 is in left chamber 298, and vice versa.

This causes air director 272 to urge air from right chamber 296 to left chamber 298, and alternately, to urge air from left chamber 298 to right chamber 296.

When air chamber sidewall opening 332 is in left chamber 298, as shown in FIG. 39, expelled impeller 318 air is urged 338 into left chamber 298, and in turn, vented out of left chamber 298 through left egress/ingress vent 310, and from there through left base sidewall vertical air passages 336, and then the impeller 318 urged air is subdivided, with part passing into upper base chamber 340 through ingress/egress holes 341.

As shown in FIG. 39, upper base chamber 340 is disposed in the upper portion of base 270, directly above right chamber 296 and left chamber 298.

The remainder of the impeller 318 urged air not directed into upper base chamber 340 is directed into vertical air passages 280 in left tray wall 276 of tray 342, the tray stacked directly above left base sidewall 308.

From there, impeller 318 urged air is again subdivided, with a first portion entering vertical air passages 280 of the tray directly above tray 342, and a second portion vented into tray chamber 344 through ingress/egress holes 346.

This subdividing and directing of impeller 318 urged air, is repeated for each tray stacked above tray 342, until lid 268 caps the uppermost stacked tray.

Impeller 318 urged air entering tray 342 travels left to right through tray chamber 344 and across tray grating 348, and is drawn into ingress/egress holes 350, then down through vertical air passages 278, and air passages 352, and then through right egress/ingress vent 304, where it enters right chamber 296, and is pulled into pie shaped opening 330.

This is true for analogous portions of all trays stacked above tray 342, and for analogous portions of upper base portion 268.

The above air flow is exactly reversed, when pie shaped opening 330 is rotated to be within left chamber 298.

As a consequence of the above, foods resting on tray grating 348, are exposed to impeller 318 urged air, first flowing from left to right, and alternately from right to left.

As a non-limiting and non-exhaustive example, this alternating direction may help to even food dehydration across all portions of tray grating 348.

Interior temperatures and introduction of new outside air into example embodiment 266 may be adjusted by rotating adjustable vent cover 354.

DETAILED DESCRIPTION OF EXAMPLE EMBODIMENT 356—FIGS. 42 THROUGH 57

FIGS. 42 through 57 show an example embodiment 356 which comprises stackable, compactable, trays, design 3 107, which is in turn an alternative to stackable, compactable, trays, design 1 103.

Stackable, compactable, trays, design 3 107, is constructed generally analogously to stackable, compactable, trays, design 1 103, except for the construction of stackable, compactable, trays, design 3's 107 hinges 370, 366, 364 and 368 are different than trays, design 1 103 hinges 156, 158, 160 and 162.

Trays, design 3's 107 hinges 370, 366, 364 and 368 use repeated typical hinge element 374, which is comprised of four sub elements.

Affixed to the bottom of each tray wall, in each typical hinge element 374, are cylindrical, horizontal pin 376 and U-shaped horizontal trough 378 (FIG. 57 in particular).

Affixed to each peripheral side of floor 380 are upward opening, U-shaped, horizontal trough 382, and ratchet/pivot pin 384 (FIG. 57 in particular).

During assembly, as shown in FIG. 56, right tray wall 362, is disposed horizontally. This disposes U-shaped horizontal trough 378 so that it opens downward. When right tray wall 362 is then lowered to connect with the right edge of floor 380, ratchet/pivot pin 384 easily slides into U-shaped horizontal trough 378, and simultaneously cylindrical, horizontal pin 376, easily slides into upward opening, U-shaped, horizontal trough 382.

Subsequently, when right tray wall 362 is rotated to its vertical, in-use disposition (FIG. 44), U-shaped horizontal trough 378 opens rightward. This results in capturing ratchet/pivot pin 34 so that right tray wall 362 cannot move to the right, and cannot move upward or downward.

Simultaneous with this, upward opening, U-shaped, horizontal trough 382 prevents right tray wall 362 from moving downward and from moving to the left or to the right. Pin mounting groove 386 engages upward opening, U-shaped, horizontal trough 382, in a manner which prevents forward or rearward movement.

In combination, the above mechanical engagements allow pivoting about the hinge axes, but prevent any other lateral movements.

When subsequently, right tray wall 362 is further rotated to its compacted condition, as shown in FIG. 42, U-shaped horizontal trough 378 opens upwardly. This results in capturing ratchet/pivot pin 384 so that right tray wall 362 cannot move to the right or left, and cannot move upward.

Simultaneously with this upward opening, U-shaped, horizontal trough 382 prevents right tray wall 362. From moving downward and from moving right or left. Pin mounting groove 386 engages upward opening, U-shaped, horizontal trough 382, in a manner which prevents forward or rearward movement.

In combination, the above mechanical engagements allow pivoting about the hinge axes, but prevent any other lateral movements.

When right tray wall 362 is rotated to its vertical, in-use disposition (FIG. 44,), from its assembly disposition (FIG. 56) ratchet paw 388, disposed inside of U-shaped horizontal trough 378, slides over ratchet tooth 390, which is centrally disposed along ratchet/pivot pin 384, thus preventing right tray wall 362 from rotating backward to its assembly disposition, (FIG. 56). From its vertical, in-use disposition, right tray wall 362 is, however, free to rotate forward to its horizontal compacted condition (FIG. 42). This is true for all tray walls using repeated typical, hinge element 374.

Both front tray wall 358 and rear tray wall 360 are biased, from there compacted condition (FIG. 42) toward their vertical, in-use, condition, by dual coil torsional springs 392.

Assembly of example embodiment 358, is done in steps.

First, front tray wall 358 and rear tray wall 362 are placed in their horizontal assembly disposition, and then lowered onto the edges of floor 380. They are then rotated from their horizontal assembly disposition, through their vertical in-use disposition, to their horizontal compacted condition (FIG. 56).

Next, right tray wall 362 and left tray wall 364 are placed in their horizontal assembly dispositions, and then lowered onto the edges of floor 380. They are then rotated from there horizontal assembly disposition, through their vertical in-use disposition, to their horizontal compacted condition (FIG. 42), where they snap fit into position.

From here, referring to FIGS. 42 43 and 44, to use the tray, a user simply rotates right tray wall 362 and left tray wall 364 from their horizontal assembly dispositions, to their vertical in-use disposition, where rotation is stopped by the engagement of ratchet paws 388, with ratchet teeth 390.

After this, dual coil springs 392, urge front tray wall 358, and rear tray wall 362, to their vertical in-use dispositions, where they each snap fit into position (FIG. 44).

Compacting the tray again is accomplished by simply reversing the above steps.

DETAILED DESCRIPTION OF EXAMPLE EMBODIMENT 394—FIGS. 58 THROUGH 63

FIGS. 58 through 63, illustrate an example embodiment 394. Example embodiment 394 comprises stackable, compactable, trays, design 4 108, which is an alternate construction of stackable, compact uncle, trays, design 1 103. Trays design 4 108 uses living hinges 396 398 400 402, to replace right hinge 156, front hinge 158, left hinge 160, and rear hinge 162 respectively.

Living hinges are formed by molding linear troughs with thin bottoms into sheets of pliable material such as, by way of non-limiting and non-exhaustive examples, sheets molded from polypropylene or polyethylene.

By using molded hinges, part counts are reduced, and construction is made simpler.

FIG. 58, shows a non-limiting and non-exhaustive example of how trays of design 4 108, may suitably emerge from a mold.

FIGS. 59 60 61, illustrate how trays 108 may suitably transition from their compacted condition (FIG. 59), to their in-use disposition (FIG. 61).

To accomplish this, first, left tray wall 404, and right tray wall 406, are rotated upward, from there compacted condition (FIG. 59) to their in-use disposition (FIG. 60).

Next, front tray wall 408, and rear tray wall 410, are rotated upward, from there compacted condition (FIG. 60) to their in-use disposition (FIG. 61), where they snap fit into position.

Transitioning trays, design 4 108, from their in-use disposition (FIG. 61) to their compacted condition (FIG. 59) is accomplished by simply reversing the above procedure That is, front tray wall 408, and rear tray wall 410 are first rotated downward to their compacted condition (FIG. 60), and then right tray wall 406 and left tray wall 404 are rotated downward to their compacted condition (FIG. 59).

FIGS. 62 and 63 illustrate how a first tray 412 of design 4 108 may suitably stack on top of a second tray 414 of design 4 108.

DETAILED DESCRIPTION OF EXAMPLE EMBODIMENT 416—FIGS. 64 THROUGH 73

FIG. 64 through 73, illustrate an example embodiment 416, which is comprised of: base 418, lower shelf components 420, upper shelf components 422 and lid 424.

Base 418 is identical in its lower portions to base 109, described earlier herein. It differs only in that its upper portions have been adapted to receive lower shelf component 420, and therefore has right side wall 426, front side wall 428, left side wall 430, and rear side wall 432 further extended above airflow distribution baffle 433, and has also eliminated base right side wall 176, base front side wall 178, base left side wall 180, and base rear side wall 182.

Likewise, lid 424 is identical to lid 112, except lid 424, with broadened base 434 on its lower portions, has been adapted to receive upper edge 436 of lower shelf component 420 (FIG. 73).

Lid 424 on lower edges 446 easily stacks on and off upper edges 436 of lower shelf component 420.

Lower shelf component 420, on its upper edges 436, snap fits into engagement with upper shelf component 422 along its lower edges 438 when the two are placed face to face as shown in FIGS. 71 72 and 73.

Lower shelf component 420 on its lower edges 440, easily stacks on and off upper shelf component 422, along upper shelf component 422's upper edges 442. It likewise easily stacks on and off upper edges 444 of base 418.

Referring to FIGS. 65 66 and 70, placing upper shelf component 422 inverted into lower shelf component 420, compacts example embodiment 416.

Inverted upper shelf components 422, and lower shelf components 420, may be stack together in any sequence. As non-limiting and non-exhaustive examples, inverted upper shelf components 422 may be stacked on top of lower shelf components 420, or lower shelf components 420, may be stacked on top of inverted upper shelf components 422, or inverted upper shelf components 422 may be stacked on top of inverted upper shelf components 422, or lower shelf components 420 may be stacked into lower shelf components 420. All combinations will achieve generally the same reduction in height.

Referring to FIGS. 64, 68, 71 and 72, snap fitting, face to face, upper shelf component 422 to lower shelf component 420 expands example embodiment 416 for food preparation use.

Each and all of the above example embodiments can have modified versions which invert the trays, but essentially leave the bases and lids as described, with only a few minor alterations to accommodate fitting to the new inverted trays, and to flatten the upper surfaces of their food supports.

The invention claimed is:

1. A food preparation device using heated air, comprising:
   a heat source configured to heat air to food preparation temperatures;
   a base enclosure configured to contain the heat source;
   a first tray, stacked above the base enclosure, and including a generally flat floor configured to support foods to be processed, the floor being perforated to allow air passage from one side of the floor to the other side of the floor;
   the floor being generally rectangular and comprising four generally straight edges;
   the floor includes four generally planar hinged side walls, one each hinged to each of the four generally straight edges;
   each of the four hinged side walls configured to rotate about its associated hinge axes from a generally horizontal disposition to a generally vertical disposition;
   a second tray having substantially the same construction as the first tray,
   the second tray configured to stack above the first tray when the four hinged side walls on the first tray are in their generally vertical dispositions;
   wherein, when the heat source is activated during food preparation, the four hinged side walls on the first tray and the four hinged side walls on the second tray which is stacked above the first tray, are each in their vertical dispositions; and
   wherein, when the heat source is not activated, and the device is not preparing food the four hinged side walls on the first tray and the four hinged side walls on the second tray are each oriented in their horizontal dispositions.

2. The food preparation device of claim 1 further including a countdown timer configured to shut off power to the heat source at the end of a user preset interval.

3. The food preparation device of claim 1 further including a lid capping the second tray, including a user adjustable air vent.

4. The food preparation device of claim 1 further including a non-uniformly perforated, air transmissive baffle sheet, impeding, in an uneven manner, airflow between the heat source and the first tray.

5. The food preparation device of claim 1 wherein opposing hinge side walls of the first tray include air ducts.

6. The food preparation device of claim 5 further including a fan configured to move air within the air ducts.

7. The food preparation device of claim 6 wherein the fan is configured to drive air movement within the air ducts so as to alternate between opposing directions.

8. The food preparation device of claim 1 further including a reel incorporated into the bottom of the base enclosure, configured to receive a power cord wrapped around a surface thereof.

9. The food preparation device of claim 1 further including one or more trays of generally identical construction to the first tray stackable below the first tray and above the base enclosure.

* * * * *